United States Patent
Ryu et al.

(10) Patent No.: US 12,003,973 B2
(45) Date of Patent: Jun. 4, 2024

(54) METHOD AND APPARATUS FOR TRANSMITTING C-OFDMA PPDU IN WIRELESS LAN SYSTEM

(71) Applicant: LG ELECTRONICS INC., Seoul (KR)

(72) Inventors: Kiseon Ryu, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 484 days.

(21) Appl. No.: 17/310,455

(22) PCT Filed: Jan. 2, 2020

(86) PCT No.: PCT/KR2020/000004
§ 371 (c)(1),
(2) Date: Aug. 4, 2021

(87) PCT Pub. No.: WO2020/175785
PCT Pub. Date: Sep. 3, 2020

(65) Prior Publication Data
US 2022/0124507 A1 Apr. 21, 2022

Related U.S. Application Data

(60) Provisional application No. 62/810,961, filed on Feb. 27, 2019.

(51) Int. Cl.
*H04W 16/10* (2009.01)
*H04L 5/00* (2006.01)
(Continued)

(52) U.S. Cl.
CPC .......... *H04W 16/10* (2013.01); *H04L 5/0007* (2013.01); *H04L 5/0035* (2013.01);
(Continued)

(58) Field of Classification Search
CPC ....... H04B 7/0413; H04B 7/0452; H04L 1/00; H04L 27/26; H04L 5/0007
See application file for complete search history.

(56) References Cited

U.S. PATENT DOCUMENTS

| | | | |
|---|---|---|---|
| 2019/0045508 A1* | 2/2019 | Cariou | H04W 72/0446 |
| 2019/0182842 A1* | 6/2019 | Hu | H04L 27/2626 |
| 2023/0103807 A1* | 4/2023 | Park | H04W 72/0453 370/329 |

FOREIGN PATENT DOCUMENTS

WO 2018152224 8/2018

OTHER PUBLICATIONS

PCT International Application Number PCT/KR2020/000004 International Search Report dated Apr. 9, 2020, 4 pages.
(Continued)

*Primary Examiner* — Zhensheng Zhang
(74) *Attorney, Agent, or Firm* — LEE, HONG, DEGERMAN, KANG & WAIMEY

(57) ABSTRACT

Proposed is a method and apparatus for transmitting a C-OFDMA PPDU in a wireless LAN system. Specifically, a first AP transmits a C-OFDMA request frame to a second AP. The first AP receives a C-OFDMA response frame as a response to the COFDMA request frame from the second AP. The first AP transmits a first C-OFDMA PPDU to a first STA through a first channel. A second C-OFDMA PPDU is transmitted simultaneously together with the first PPDU through a second channel by the second AP. The C-OFDMA request frame includes first information indicating that using the second channel for the second AP is allowed. The first channel corresponds to a channel remaining after excluding a preamble-punctured channel from the entire channel, and the second channel corresponds to the preamble-punctured channel.

19 Claims, 32 Drawing Sheets

(51) Int. Cl.
      *H04B 7/0413*    (2017.01)
      *H04W 80/02*     (2009.01)
      *H04W 84/12*     (2009.01)

(52) U.S. Cl.
     CPC ........... *H04B 7/0413* (2013.01); *H04W 80/02*
                     (2013.01); *H04W 84/12* (2013.01)

(56) References Cited

OTHER PUBLICATIONS

Ryu, et al., "Consideration on multi-AP coordination for EHT," IEEE 802.11-18/1982r1, Jan. 2019, 10 pages.
Guo, et al., "AP coordination in EHT," IEEE 802.11-19/0103r0, Jan. 2019, 6 pages.
Oteri, et al., "Coordinated Multi-AP Transmission for EHT," IEEE 802.11-19/0071r0, Jan. 2019, 11 pages.
Tanaka, et al., "Discussion on Multi-AP Coordination Type," IEEE 802.11-19/0104r1, Jan. 2019, 12 pages.

* cited by examiner

FIG. 2
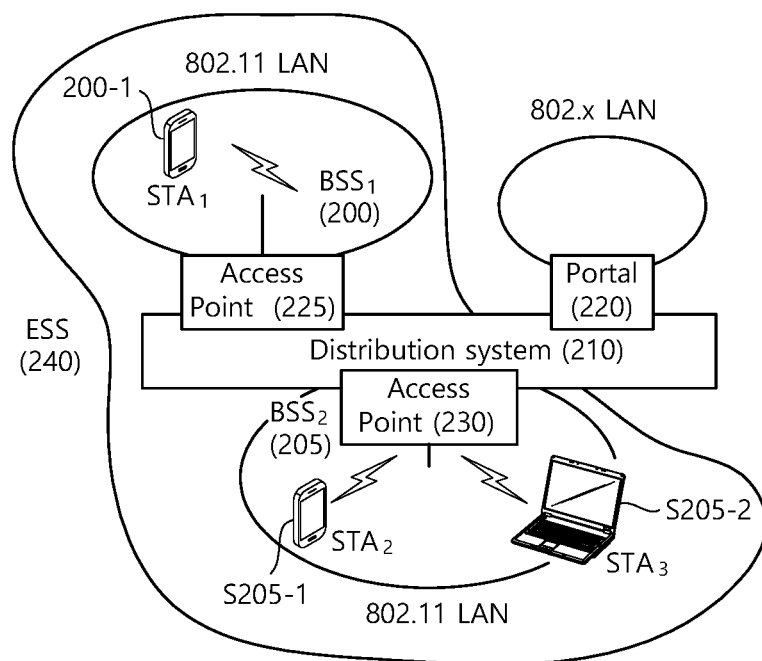
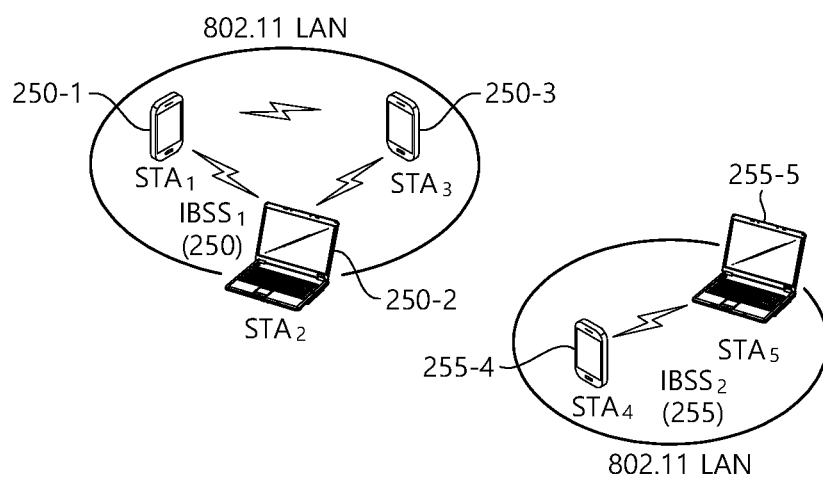

FIG. 4
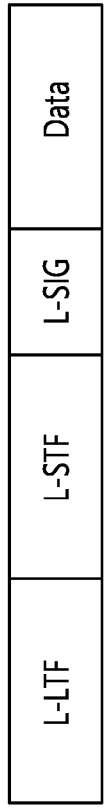
PPDU Format (IEEE 802.11a/g)
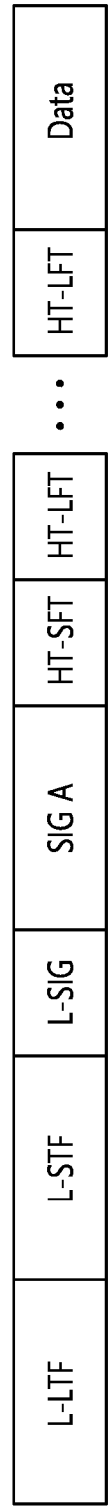
HT PPDU Format (IEEE 802.11n)
VHT PPDU Format (IEEE 802.11ac)
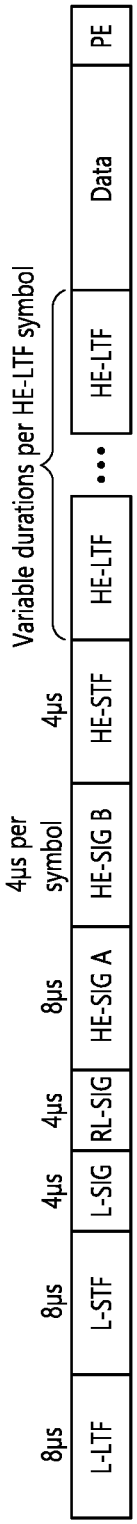

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

Single STA being served
by multiple APs

METHOD AND APPARATUS FOR TRANSMITTING C-OFDMA PPDU IN WIRELESS LAN SYSTEM

CROSS-REFERENCE TO RELATED APPLICATIONS

This application is the National Stage filing under 35 U.S.C. 371 of International Application No. PCT/KR2020/000004, filed on Jan. 2, 2020, which claims the benefit of U.S. Provisional Patent Application No. 62/810,961, filed on Feb. 27, 2019, the contents of which are all incorporated by reference herein in their entirety.

BACKGROUND OF THE DISCLOSURE

Field of the Disclosure

The present specification related to a method for transmitting a C-OFDMA PPDU in a wireless LAN system and, most particularly, to a method and apparatus for transmitting a C-OFDMA PPDU, by a multi-AP, based on a preamble puncturing method in a wireless LAN system.

Related Art

A wireless local area network (WLAN) has been improved in various ways. For example, the IEEE 802.1 lax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be referred to as the IEEE 802.11be standard.

An increased number of spatial streams may be used in the new wireless LAN standard. In this case, in order to properly use the increased number of spatial streams, a signaling technique in the WLAN system may need to be improved.

SUMMARY OF THE DISCLOSURE

Technical Objects

The present specification proposes a method and apparatus for transmitting a C-OFDMA PPDU in a wireless LAN system.

Technical Solutions

An example of the present specification proposes a method for transmitting a C-OFDMA PPDU.

This embodiment may be performed in a network environment being supported by a next generation wireless LAN system. The next generation wireless LAN system is an enhanced (or evolved) version of the 802.1 lax system (EHT or 802.11be), which can satisfy backward compatibility with the 802.1 lax system.

The present embodiment is performed by a transmitting station (STA), and the transmitting STA supports multiple access points (APs). In the present embodiment, the transmitting STA may correspond to a first AP or a second AP. A receiving STA of the present embodiment is an STA supporting an Extremely High Throughput (EHT) wireless LAN system, and the receiving STA may correspond to a first STA, a second STA or a third STA.

A first access point (AP) transmits a Coordinated-Orthogonal Frequency Division Multiple Access (C-OFDMA) request frame to a second AP.

The first AP receives a C-OFDMA response frame, from the second AP, as a response to the C-OFDMA request frame.

The first AP transmits a first C-OFDMA PPDU to a first station (STA) through a first channel. At the same time as the first PPDU, a second C-OFDMA PPDU is transmitted, by the second AP, through a second channel.

The C-OFDMA request frame includes first information authorizing (or allowing) usage of the second channel for the second AP. That is, the first AP may notify channels (at least one non-primary 20 MHz channel) through which the second AP may perform C-OFDMA transmission based on the C-OFDMA request frame.

The full channel may include a primary 20 MHz channel and at least one non-primary 20 MHz channel. For example, if the full channel is a channel having an 80 MHz bandwidth, the full channel may include the primary 20 MHz channel, a secondary 20 MHz channel, and a secondary 40 MHz channel (two non-primary 20 MHz channels).

The first information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the second AP that has received the bitmap information may know that the channel being capable of performing C-OFDMA transmission with the first AP is a secondary 20 MHz channel.

The first channel is a channel excluding a preamble-punctured channel from the full channel. The second channel is the preamble-punctured channel.

Effects of the Disclosure

According to the embodiment(s) proposed in the present specification, by transmitting a C-OFDMA PPDU at the same time by having another AP use a channel that is busy for one AP, based on a preamble puncturing method, interference according to BSS may be prevented, and resource may be efficiently used.

BRIEF DESCRIPTION OF THE DRAWINGS

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

DESCRIPTION OF EXEMPLARY EMBODIMENTS

In the present specification, a slash (/) or comma may indicate "and/or". For example, "A/B" may indicate "A and/or B", and therefore may mean "only A", "only B", or "A and B". Technical features that are separately described in one drawing may be implemented separately or may be implemented simultaneously.

In the present specification, parentheses may indicate "for example". Specifically, "control information (EHT-Signal)" may mean that the "EHT-Signal" is proposed as an example of the "control information". Further, "control information (i.e., EHT-Signal)" may also mean that the "EHT-Signal" is proposed as an example of the "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be. Further, the present specification may be applied to a new WLAN stand which has enhanced IEEE 802.11be.

Hereinafter, technical features of a WLAN system to which the present specification is applicable are described in order to describe technical features of the present specification.

Figure 1:
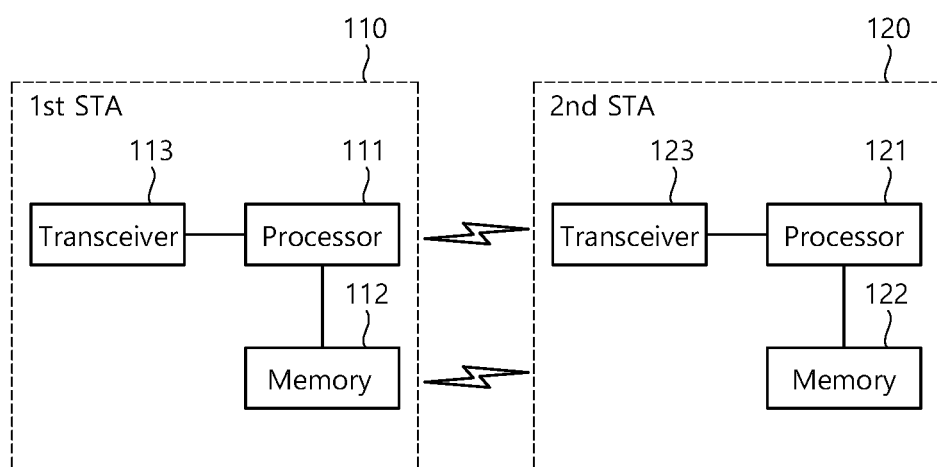
FIG. 1 shows an example of a transmitting apparatus and/or receiving apparatus of the present specification.

FIG. 1 shows an example of a transmitting apparatus and/or receiving apparatus of the present specification.

In the example of FIG. 1, various technical features described below may be performed. FIG. 1 relates to two stations (STAs). For example, STAs (110, 120) of the present specification may also be called in various terms such as a mobile terminal, a wireless device, a wireless transmit/receive unit (WTRU), a user equipment (UE), a mobile station (MS), a mobile subscriber unit, or simply a user. Further, the STAs (110, 120) of the present specification may also be referred to as various names such as a receiving apparatus, a transmitting apparatus, a receiving STA, a transmitting STA, a receiving device, a transmitting device, or the like.

The STAs (110, 120) may serve as an AP or a non-AP. That is, the STAs (110, 120) of the present specification may serve as the AP and/or the non-AP.

The STAs (110, 120) of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like.

The STAs (110, 120) of the present specification may include a medium access control (MAC) conforming to the IEEE 802.11 standard and a physical layer interface for a radio medium.

The first STA (110) may include a processor (111), a memory (112), and a transceiver (113). The illustrated process, memory, and transceiver may be implemented individually as separate chips, or at least two blocks/functions may be implemented through a single chip.

The transceiver (113) of the first STA performs a signal transmission/reception operation. Specifically, an IEEE 802.11 packet (e.g., IEEE 802.11a/b/g/n/ac/ax/be, and so on) may be transmitted/received.

For example, the first STA (110) may perform an operation intended by an AP. For example, the processor (111) of the AP may receive a signal through the transceiver (113), process a reception (RX) signal, generate a transmission (TX) signal, and provide control for signal transmission. The memory (112) of the AP may store a signal (e.g., RX signal) received through the transceiver (113), and may store a signal (e.g., TX signal) to be transmitted through the transceiver.

For example, the second STA (120) may perform an operation intended by a non-AP STA. For example, a transceiver (123) of a non-AP performs a signal transmission/reception operation. Specifically, an IEEE 802.11 packet (e.g., IEEE 802.11a/b/g/n/ac/ax/be packet, and so on) may be transmitted/received.

For example, a processor (121) of the non-AP STA may receive a signal through the transceiver (123), process an RX signal, generate a TX signal, and provide control for signal transmission. A memory (122) of the non-AP STA may store a signal (e.g., RX signal) received through the transceiver (123), and may store a signal (e.g., TX signal) to be transmitted through the transceiver.

For example, an operation of a device indicated as an AP in the specification described below may be performed in the first STA (110). For example, if the first STA (110) is the AP, the operation of the device indicated as the AP may be controlled by the processor (111) of the first STA (110), and a related signal may be transmitted or received through the transceiver (113) controlled by the processor (111) of the first STA (110). In addition, control information related to the operation of the AP or a TX/RX signal of the AP may be stored in the memory (112) of the first STA (110).

For example, in the specification described below, an operation of a device indicated as a non-AP (or user-STA) may be performed in the second STA (120). For example, if the second STA (120) is the non-AP, the operation of the device indicated as the non-AP may be controlled by the processor (121) of the second STA (120), and a related signal may be transmitted or received through the transceiver (123) controlled by the processor (121) of the second STA (120). In addition, control information related to the operation of the non-AP or a TX/RX signal of the non-AP may be stored in the memory (122) of the second STA (120).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs (200, 205) (hereinafter, referred to as BSS). The BSSs (200, 205) as a set of an AP and a STA such as an access point (AP) (225) and a station (STA1) (200-)1 which are successfully synchronized to communicate with each other are not concepts indicating a specific region. The BSS (205) may include one or more STAs (205-1, 205-2) which may be joined to one AP (230).

The BSS may include at least one STA, APs providing a distribution service, and a distribution system (DS) (210) connecting multiple APs.

The distribution system (210) may implement an extended service set (ESS) (240) extended by connecting the multiple BSSs (200, 205). The ESS (240) may be used as a term indicating one network configured by connecting one or more APs (225, 230) through the distribution system (210). The AP included in one ESS (240) may have the same service set identification (SSID).

A portal (220) may serve as abridge which connects the wireless LAN network (IEEE 802.11) and another network (e.g., 802.X).

In the BSS illustrated in the upper part of FIG. 2, a network between the APs (225, 230) and a network between the APs (225, 230) and the STAs (200-1, 205-1, 205-2) may be implemented. However, the network is configured even between the STAs without the APs (225, 230) to perform communication. A network in which the communication is performed by configuring the network even between the STAs without the APs (225, 230) is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs (250-1, 250-2, 250-3, 255-4, 255-5) are managed by a distributed manner. In the IBSS, all STAs (250-1, 250-2, 250-3, 255-4, 255-5) may be constituted by movable STAs and are not permitted to access the DS to constitute a self-contained network.

Figure 3:
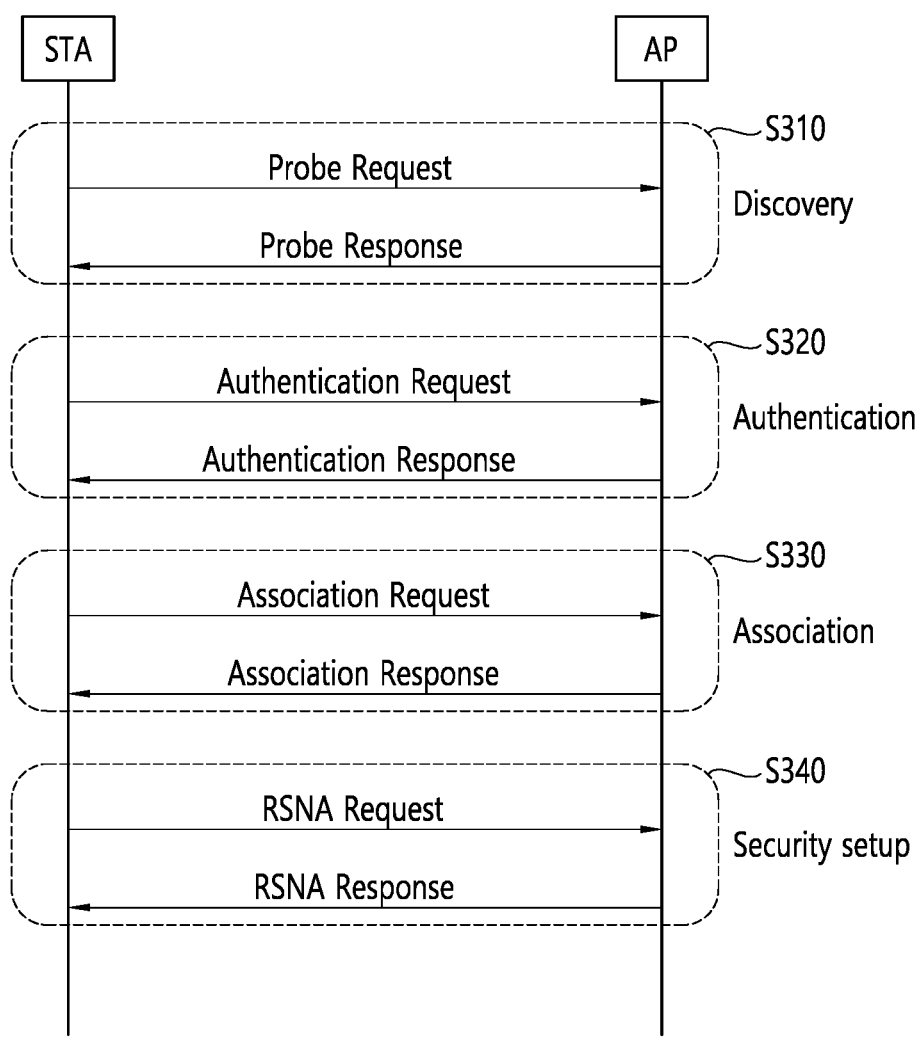
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated in FIG. 4, various types of PHY protocol data units (PPDUs) are used in IEEE a/g/n/ac standards. Specifically, an LTF and an STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.1 lax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
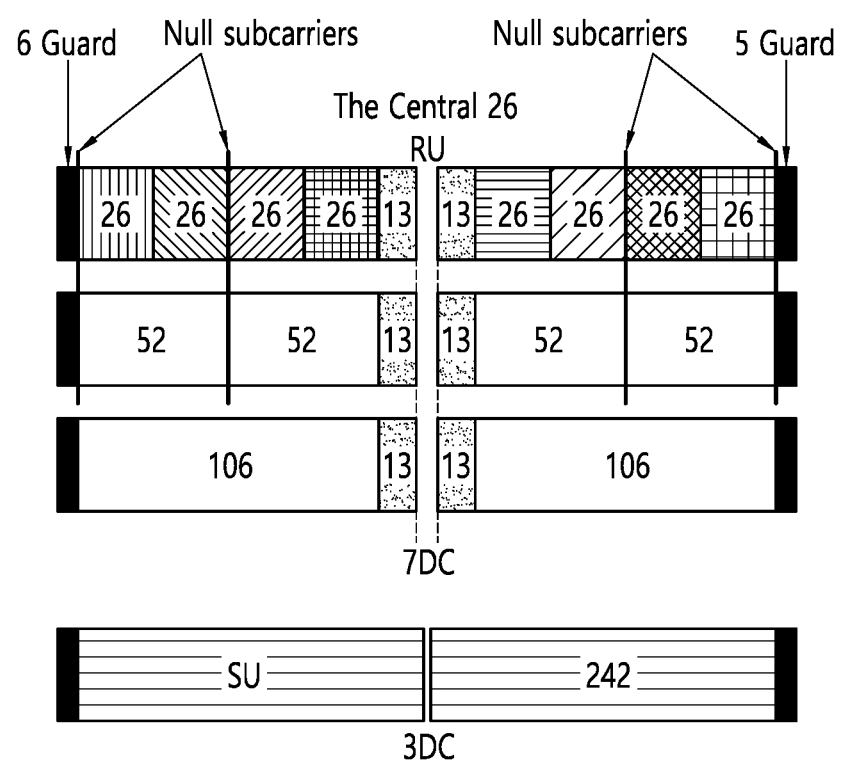
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
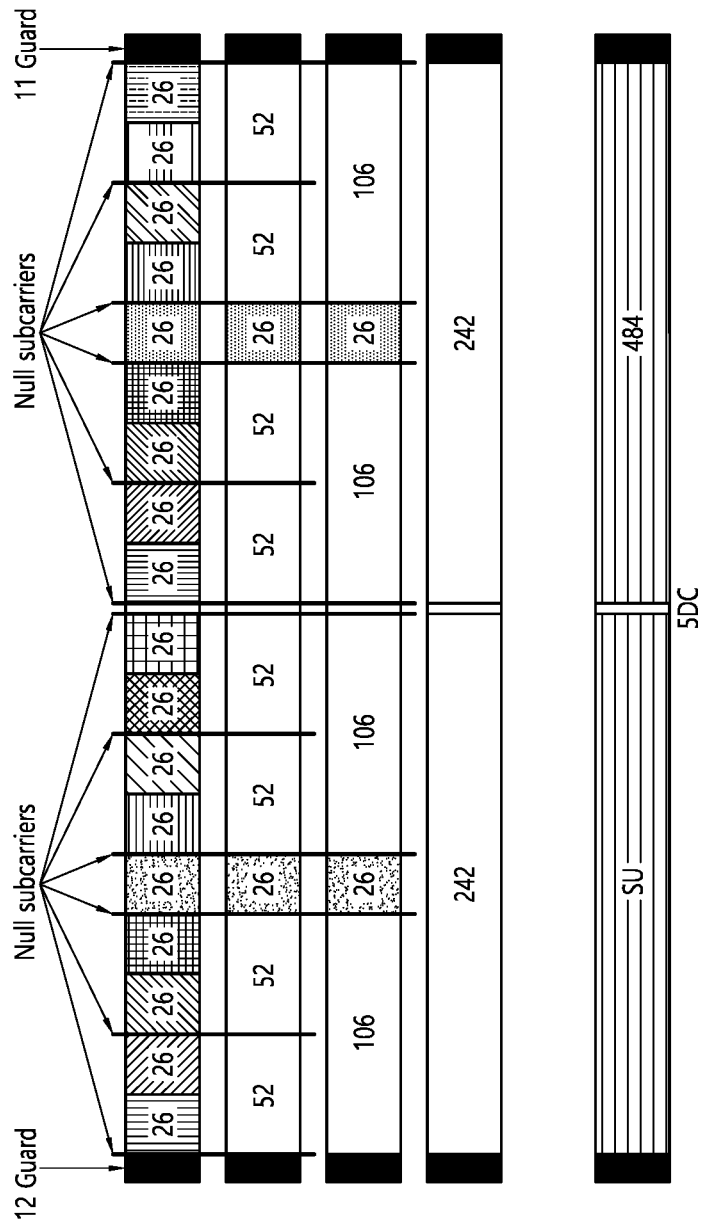
FIG. 6 illustrates a layout of RUs used in a band of 40 MHz.

FIG. 6 illustrates a layout of RUs used in a band of 40 MHz.

Similar to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similar to FIG. 5.

Figure 7:
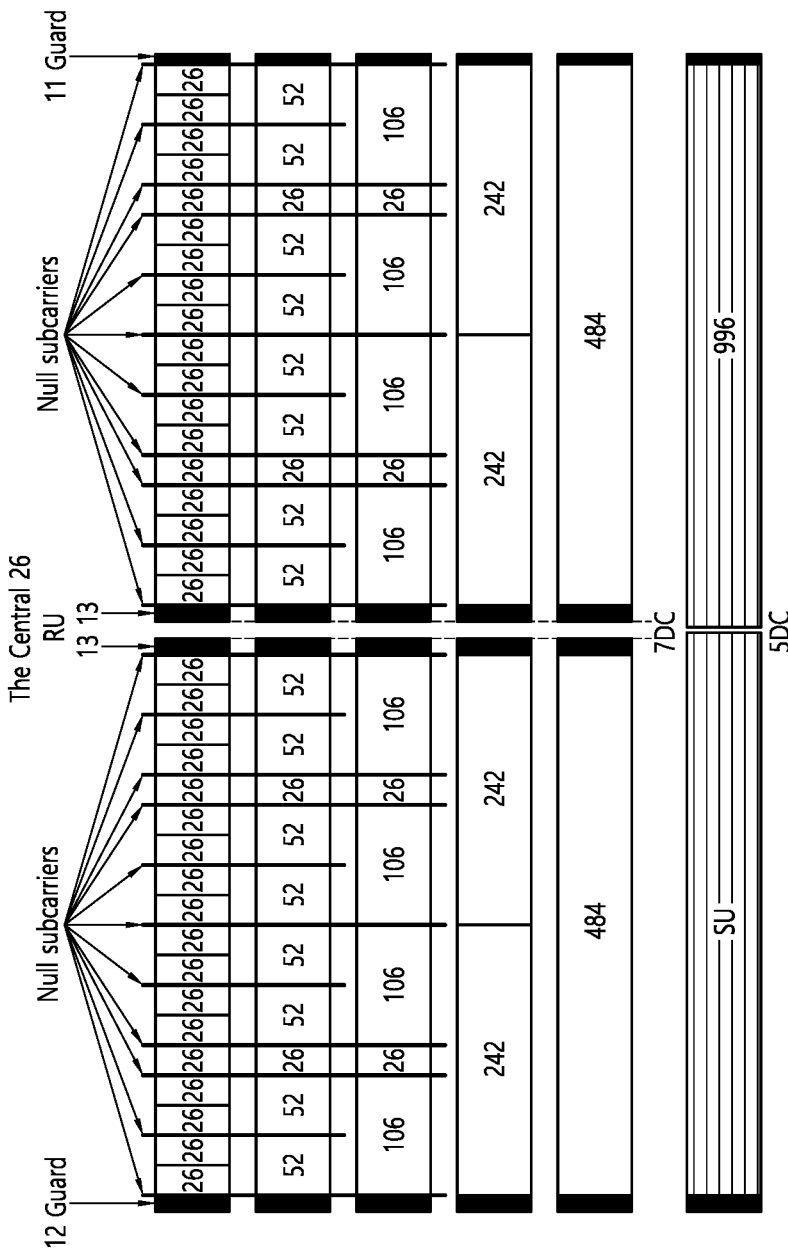
FIG. 7 illustrates a layout of RUs used in a band of 80 MHz.

FIG. 7 illustrates a layout of RUs used in a band of 80 MHz.

Similar to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g., EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, and so on) to a first STA through the trigger frame, and may allocate a second RU (e.g., 26/52/106/242-RU, and so on) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, and so on) to the first STA, and may allocate the second RU (e.g., 26/52/106/242-RU, and so on) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
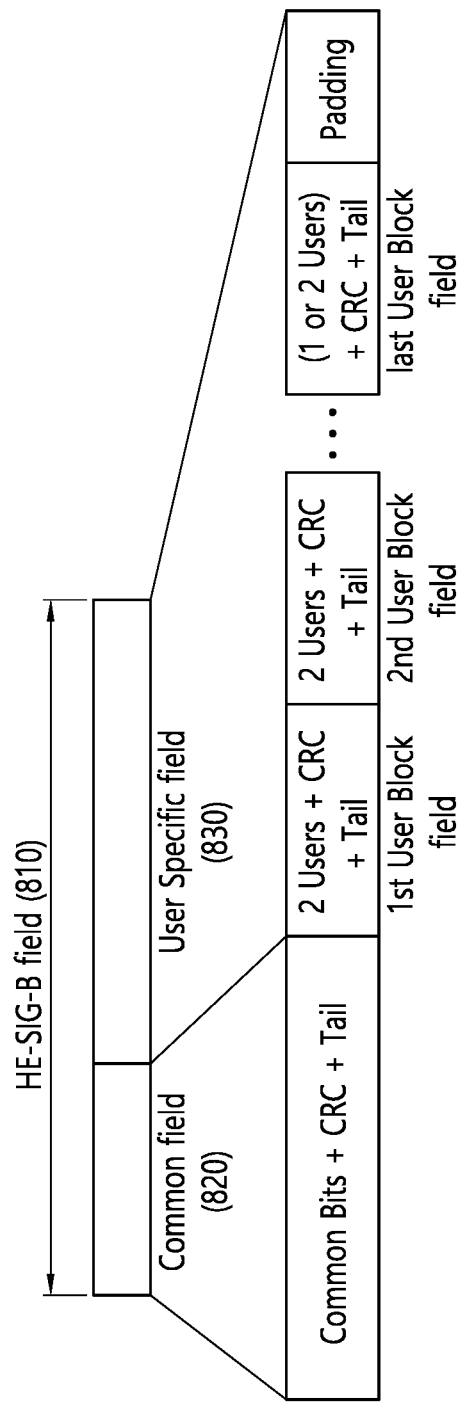
FIG. 8 illustrates a structure of an HE-SIG-B field.

FIG. 8 illustrates a structure of an HE-SIG-B field.

As illustrated, an HE-SIG-B field (810) includes a common field (820) and a user-specific field (830). The common field (820) may include information commonly applied to all users (i.e., user STAs) which receive SIG-B. The user-specific field (830) may be called a user-specific control field. When the SIG-B is transferred to a plurality of users, the user-specific field (830) may be applied only any one of the plurality of users.

As illustrated in FIG. 8, the common field (820) and the user-specific field (830) may be separately encoded.

The common field (820) may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field (820) is set to "00000000" as shown in Table 1, the nine 26-RUs may be allocated to a corresponding channel (i.e., 20 MHz). In addition, when the RU allocation information of the common field (820) is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information. For example, the RU allocation information may include an example of Table 2 below.

TABLE 2

| | | | | | | |
|---|---|---|---|---|---|---|
| 00010$y_2y_1y_0$ | 52 | | 52 | — | 106 | 8 |
| 00011$y_2y_1y_0$ | | 106 | | — | 52 | 52 | 8 |
| 00100$y_2y_1y_0$ | 26 | 26 | 26 | 26 | 26 | 106 | 8 |
| 00101$y_2y_1y_0$ | 26 | 26 | | 52 | 26 | 106 | 8 |
| 00110$y_2y_1y_0$ | 52 | | 26 | 26 | 26 | 106 | 8 |
| 00111$y_2y_1y_0$ | 52 | | 52 | | 26 | 106 | 8 |
| 01000$y_2y_1y_0$ | | 106 | | 26 | 26 | 26 | 26 | 26 | 8 |
| 01001$y_2y_1y_0$ | | 106 | | 26 | 26 | 26 | 52 | 8 |
| 01010$y_2y_1y_0$ | | 106 | | 26 | 52 | 26 | 26 | 8 |
| 01011$y_2y_1y_0$ | | 106 | | 26 | 52 | 52 | 8 |
| 0110$y_1y_0z_1z_0$ | | 106 | | — | 106 | 16 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field (830) may include a plurality of user fields. As described above, the number of STAs (e.g., user STAs) allocated to a specific channel may be determined based on the RU allocation information of the common field (820). For example, when the RU allocation information of the common field (820) is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
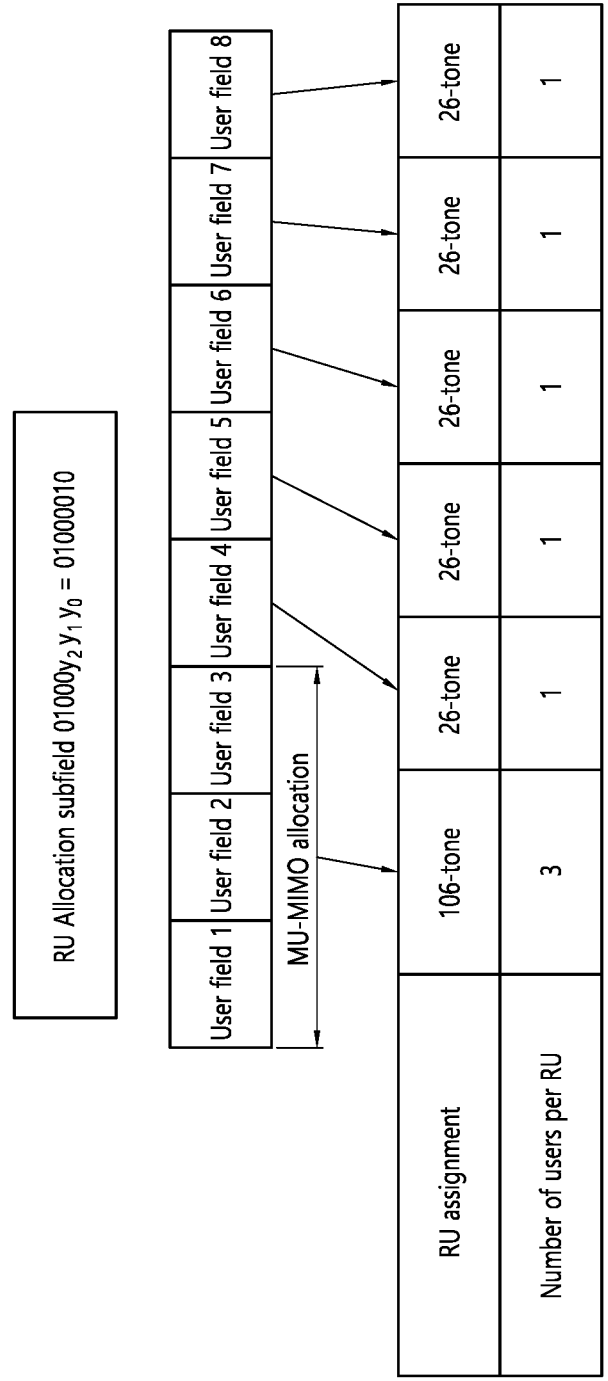
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field (830) of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format.

The first format or the second format may include bit information of the same length (e.g., 21 bits).

Figure 10:
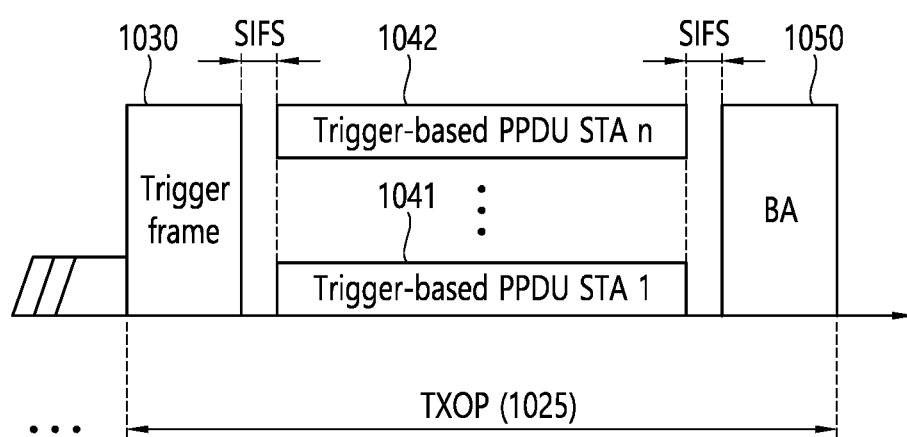
FIG. 10 illustrates an operation based on UL-MU.

FIG. 10 illustrates an operation based on UL-MU. As illustrated, a transmitting STA (e.g., AP) may perform channel access through contending (e.g., a backoff operation), and may transmit a trigger frame (1030). That is, the transmitting STA may transmit a PPDU including the trigger frame (1030). Upon receiving the PPDU including the trigger frame, a trigger-based (TB) PPDU is transmitted after a delay corresponding to SIFS.

TB PPDUs (1041, 1042) may be transmitted at the same time period, and may be transmitted from a plurality of STAs (e.g., user STAs) having AIDs indicated in the trigger frame (1030). An ACK frame (1050) for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
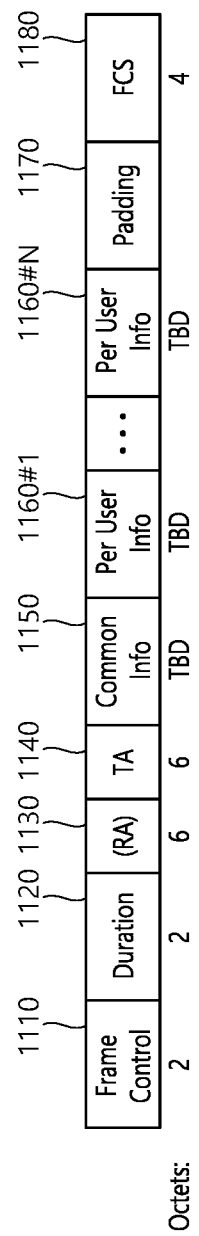
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field (1110) of FIG. 11 may include information related to a MAC protocol version and extra additional control information. A duration field (1120) may include time information for NAV configuration or information related to an identifier (e.g., AID) of a STA.

In addition, an RA field (1130) may include address information of a receiving STA of a corresponding trigger frame, and may be optionally omitted. A TA field (1140) may include address information of a STA (e.g., AP) which transmits the corresponding trigger frame. A common information field (1150) includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields (1160 #1 to 1160 #N) corresponding to the number of receiving STAs which receive the trigger frame of FIG. 11 are preferably included. The per user information field may also be called an "allocation field".

In addition, the trigger frame of FIG. 11 may include a padding field (1170) and a frame check sequence field (1180).

Each of the per user information fields (1160 #1 to 1160 #N) shown in FIG. 11 may include a plurality of subfields.

Figure 12:
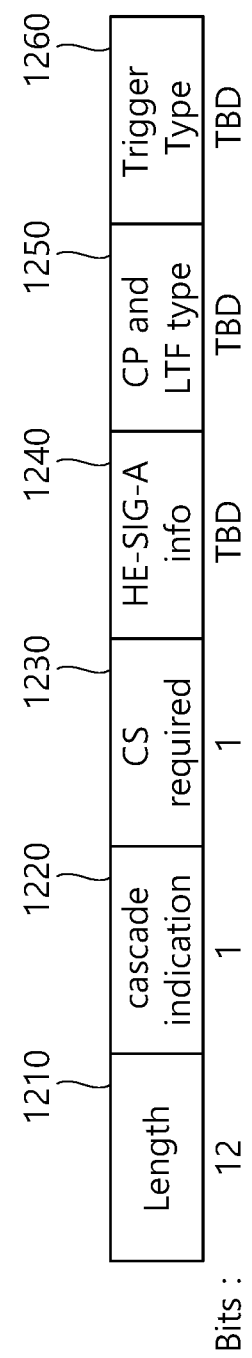
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field (1210) illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field (1210) of the trigger frame may be used to indicate the length of the corresponding uplink PPDU.

In addition, a cascade identifier field (1220) indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field (1230) indicates whether a wireless medium state or a NAV or the like is necessarily considered in a situation where a receiving device which has received a corresponding trigger frame transmits a corresponding uplink PPDU.

An HE-SIG-A information field (1240) may include information for controlling content of a SIG-A field (i.e., HE-SIG-A field) of the uplink PPDU in response to the corresponding trigger frame.

A CP and LTF type field (1250) may include information related to a CP length and LTF length of the uplink PPDU transmitted in response to the corresponding trigger frame. A trigger type field (1260) may indicate a purpose of using the corresponding trigger frame, for example, typical triggering, triggering for beamforming, a request for block ACK/NACK, or the like.

It may be assumed that the trigger type field (1260) of the trigger frame in the present specification indicates a trigger frame of a basic type for typical triggering. For example, the trigger frame of the basic type may be referred to as a basic trigger frame.

Figure 13:
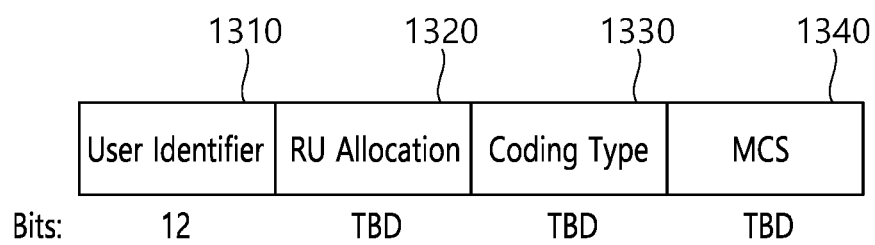
FIG. 13 illustrates an example of a subfield included in a per user information field.

FIG. 13 illustrates an example of a subfield included in a per user information field. A user information field (1300) of FIG. 13 may be understood as any one of the per user information fields (1160 #1 to 1160 #N) mentioned above with reference to FIG. 11. A subfield included in the user information field (1300) of FIG. 13 may be partially omitted, and an extra subfield may be added. In addition, a length of each subfield illustrated may be changed.

A user identifier field (1310) of FIG. 13 indicates an identifier of a STA (i.e., receiving STA) corresponding to per user information. An example of the identifier may be the entirety or part of an association identifier (AID) value of the receiving STA.

In addition, an RU allocation field (1320) may be included. That is, when the receiving STA identified through the user identifier field (1310) transmits a TB PPDU in response to the trigger frame, the TB PPDU is transmitted through an RU indicated by the RU allocation field (1320). In this case, the RU indicated by the RU allocation field (1320) may be an RU shown in FIG. 5, FIG. 6, and FIG. 7.

The subfield of FIG. 13 may include a coding type field (1330). The coding type field (1330) may indicate a coding type of the TB PPDU. For example, when BCC coding is applied to the TB PPDU, the coding type field (1330) may be set to '1', and when LDPC coding is applied, the coding type field (1330) may be set to '0'.

In addition, the subfield of FIG. 13 may include an MCS field (1340). The MCS field (1340) may indicate an MCS scheme applied to the TB PPDU. For example, when BCC coding is applied to the TB PPDU, the coding type field (1330) may be set to '1', and when LDPC coding is applied, the coding type field (1330) may be set to '0'.

Hereinafter, a UL OFDMA-based random access (UORA) scheme will be described.

Figure 14:
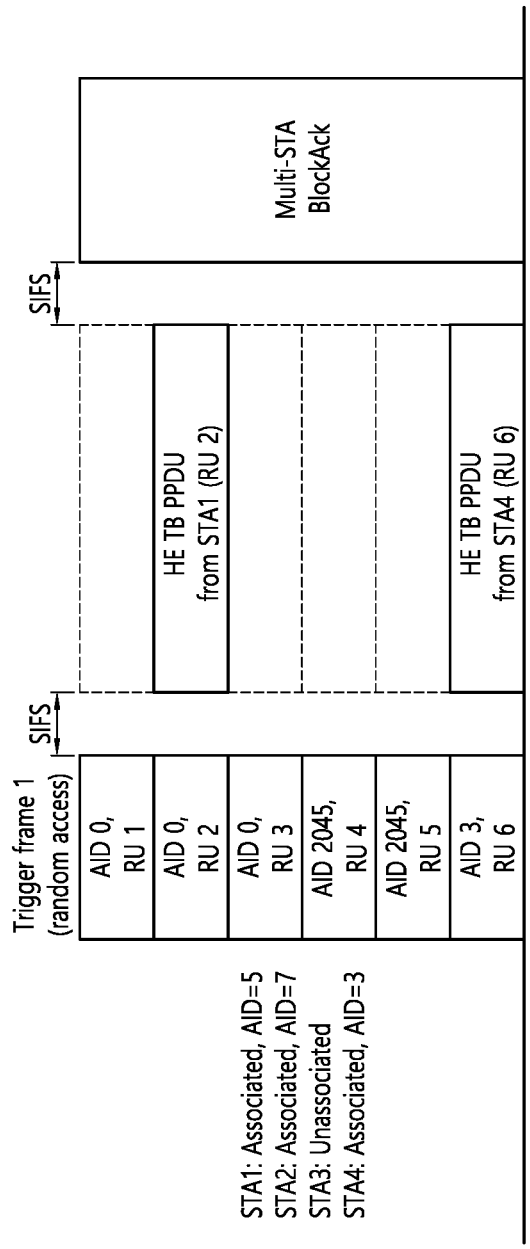
FIG. 14 describes a technical feature of the UORA scheme.

FIG. 14 describes a technical feature of the UORA scheme.

A transmitting STA (e.g., AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field (1310) of FIG. 13. Information related to the RU 1 to RU 6 may be included, for example, in the RU allocation field (1320) of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
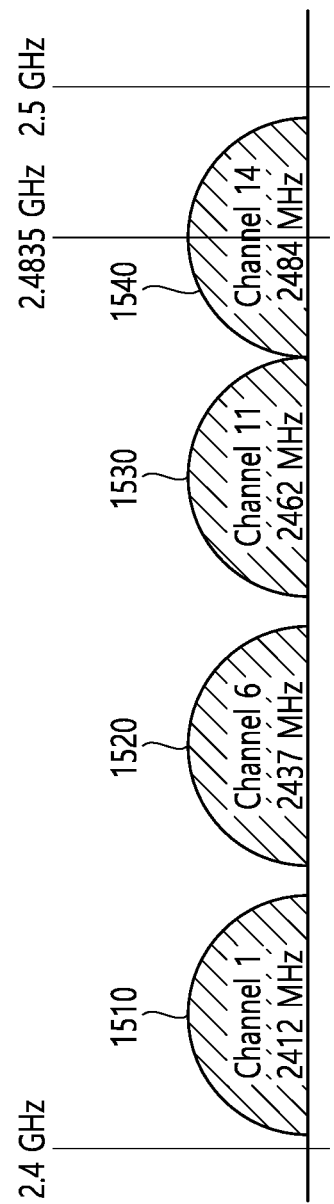
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains (1510 to 1540) shown herein may include one channel. For example, the 1st frequency domain (1510) may include a channel 1 (a 20 MHz channel having an index 1). In this case, a center frequency of the channel 1 may be set to 2412 MHz. The 2nd frequency domain (1520) may include a channel 6. In this case, a center frequency of the channel 6 may be set to 2437 MHz. The 3rd frequency domain (1530) may include a channel 11. In this case, a center frequency of the channel 11 may be set to 2462 MHz. The 4th frequency domain (1540) may include a channel 14. In this case, a center frequency of the channel 14 may be set to 2484 MHz.

Figure 16:
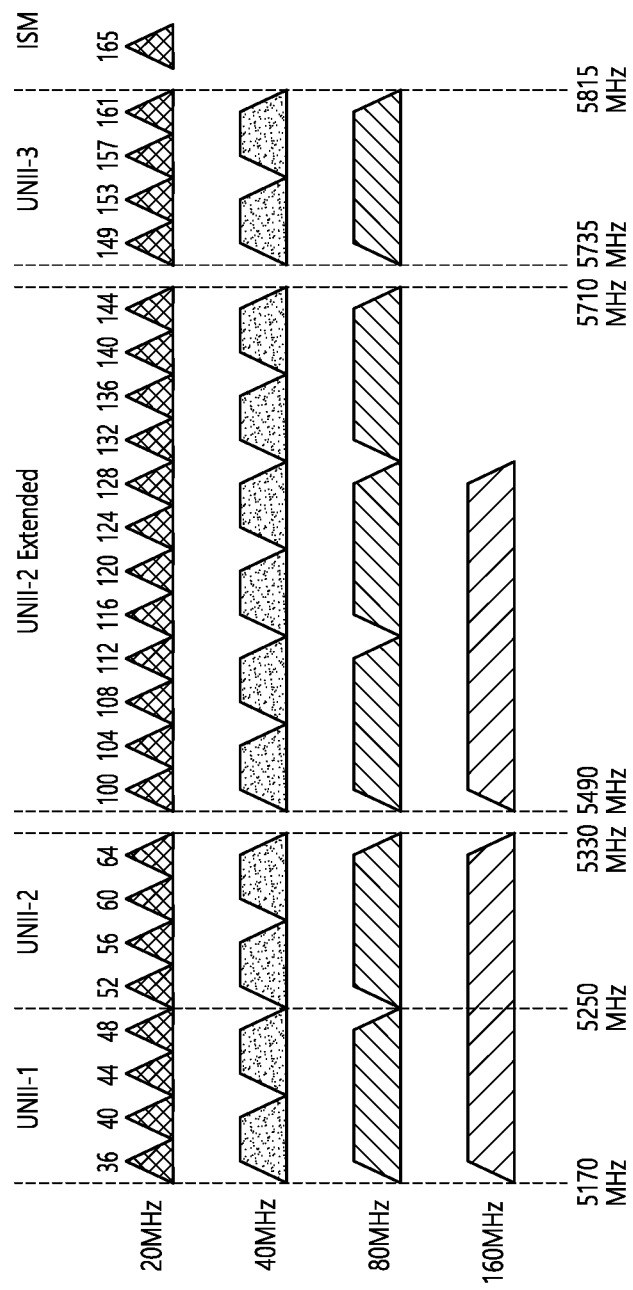
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band includes an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
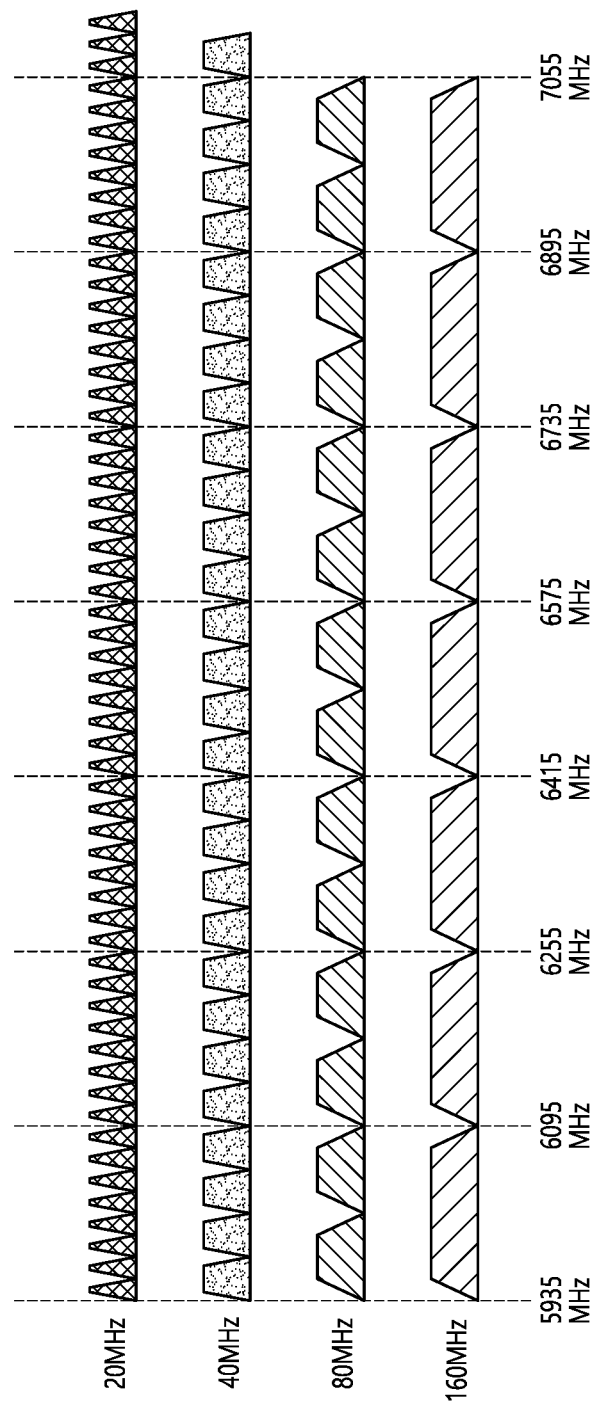
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields depicted in FIG. 18 may be referred to as various terms. For example, a SIG A field may be referred to an EHT-SIG-A field, a SIG B field may be referred to an EHT-SIG-B, an STF field may be referred to an EHT-STF field, and an LTF field may be referred to an EHT-LTF.

The subcarrier spacing of the L-LTF, L-STF, L-SIG, and RL-SIG fields of FIG. 18 can be set to 312.5 kHz, and the subcarrier spacing of the STF, LTF, and Data fields of FIG. 18 can be set to 78.125 kHz. That is, the subcarrier index of the L-LTF, L-STF, L-SIG, and RL-SIG fields can be expressed in unit of 312.5 kHz, and the subcarrier index of the STF, LTF, and Data fields can be expressed in unit of 78.125 kHz.

The SIG A and/or SIG B fields of FIG. 18 may include additional fields (e.g., a SIG C field or one control symbol, and so on). The subcarrier spacing of all or part of the SIG A and SIG B fields may be set to 312.5 kHz, and the subcarrier spacing of the remaining part/fields may be set to 78.125 kHz.

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, and so on), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

1. Carrier Sense Multiple Access/Collision Avoidance (CSMA/CA)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment. For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision (or conflict) exists. Therefore, a distributed coordination function (DCF), which is a carrier sense multiple access/collision avoidance (CSMA/CA) mechanism, is introduced in 802.11. Herein, stations (STAs) having data intended to be transmitted perform clear channel assessment (CCA) for sensing a medium during a specific duration (e.g., DCF inter-frame space (DIFS)) before transmitting the data. In this case, if the medium is idle, the STA may transmit the data by using the medium. On the other hand, if the medium is busy, under the assumption that several STAs have already waited for the use of the medium, the data may be transmitted after waiting for a random backoff period in addition to the DIFS. In this case, the random backoff period may allow the collision to be avoidable because, under the assumption that there are several STAs for transmitting data, each STA has a different backoff interval stochastically and, thus, eventually has a different transmission time. When one STA starts transmission, the other STAs cannot use the medium.

The random backoff time and the procedure will be simply described as follows. When a specific medium transitions (or shifts) from busy to idle, several STAs start a preparation for data transmission. In this case, to minimize collision (or conflict), the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, the CW value is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and, thereafter, continuously monitors a medium while counting down a backoff slot. In the meantime, if the medium enters a busy state, the countdown is stopped, and when the medium returns to an idle state, the countdown of the remaining backoff slots is resumed.

The very basis of CSMA/CA is carrier sense. A user equipment (UE) (or terminal) uses physical carrier sense and virtual carrier sense in order to determine whether or not a DCF medium is busy/idle. Physical carrier sense is carried out in a physical layer (PHY) and is carried out through energy detection or preamble detection. For example, when it is determined that a voltage level is measured or a preamble is read in a Rx end (or receiver), a medium may be determined to be in a busy state. Virtual carrier sense is carried out through a Duration field value by configuring a network allocation vector (NAV) so that other STAs cannot transmit data.

2. PHY Procedure

Although a specific packet configuration method may differ, a PHY transmit/receive procedure in Wi-Fi is as follows. For convenience, only 11n and 11ax will be given as examples. However, 11 g/ac shall also follow a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is referred to as a PPDU.

Generally, the PHY receive procedure is as follows. When performing energy detection and preamble detection (L/HT/VHT/HE-preamble detection for each Wi-Fi version), information on a PSDU configuration is obtained from a PHY header (L/HT/VHT/HE-SIG) so as to read a MAC header and then to read data.

In an Extremely High Throughput (EHT) TIG of IEEE 802.11, as one of the next generation Wi-Fi features, the following methods are proposed based on multi-AP coordination.

3. Enhancement of a Multi-AP System

Mesh Wi-Fi (a Multi-AP solution) is being accepted in the market for a more enhanced application range, easier deployment, and higher throughput.

It is preferable to enhance Mesh Wi-Fi performance via joint optimization of MAC and PHY for a multi-AP system. Hardware for multi-AP systems has already been launched in the market, and, unlike the 16 spatial streams, almost no cost occurs.

Excellent technologies for enhancing the performance of multi-AP systems exist. Such technologies may include distributed MIMO, cooperative transmission, space/time/frequency sharing and reuse, effective relay scheme, and so on.

Figure 19:
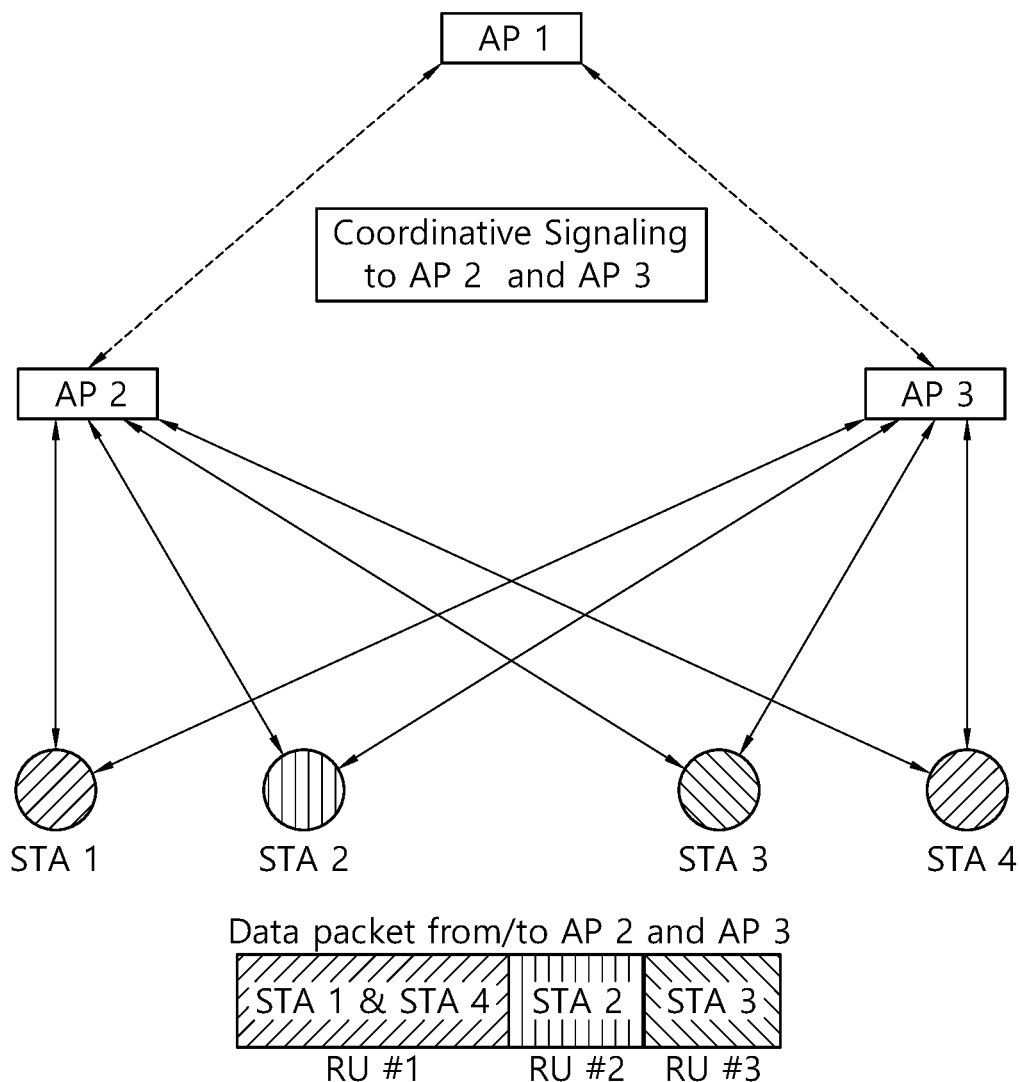
FIG. 19 shows an example of activating joint multi-AP transmission.

FIG. 19 shows an example of activating joint multi-AP transmission. Referring to FIG. 19, AP 1 initiates joint transmission by sending a coordination signal to AP 2 and AP 3. AP 2 and AP 3 transmit and receive data to and from multiple STAs by using OFDMA and MU-MIMO within one data packet. Each of STA 2 and STA 3 exists in a different resource unit (RU), and each RU is a frequency segment. STA 1 and STA 4 exist in the same resource unit (RU) by using MU-MIMO. Each RU may be transmitted to multiple spatial streams.

4. Multi-AP Coordination

Figure 20:
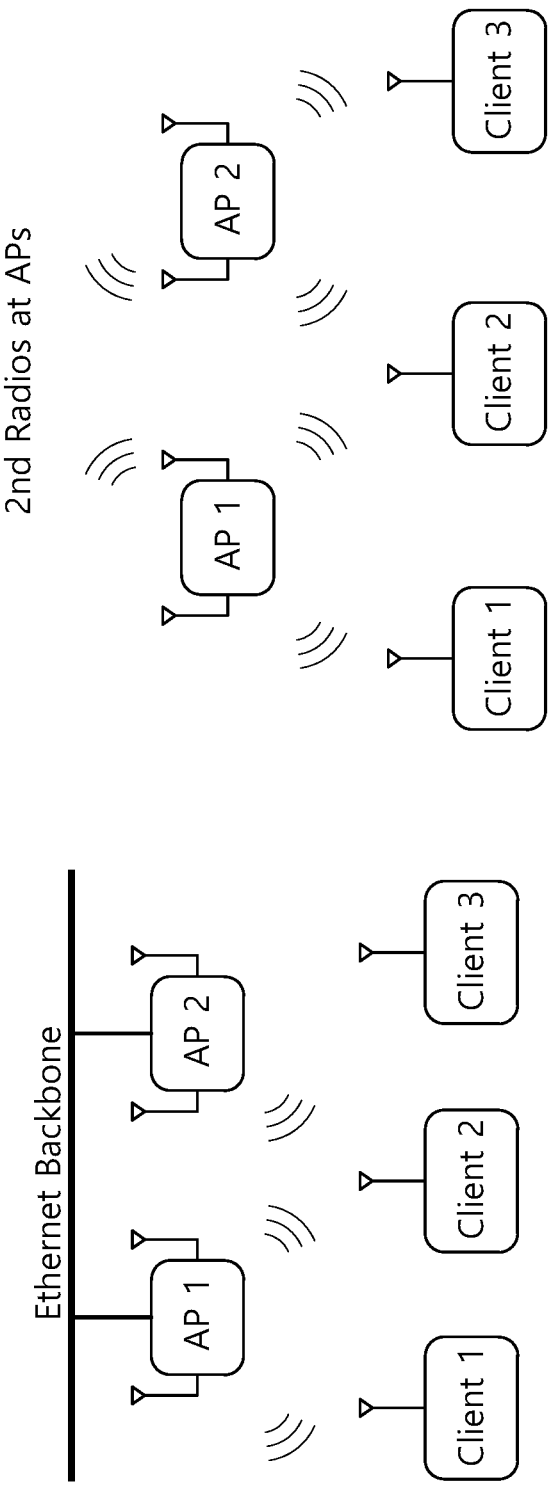
FIG. 20 is a diagram showing multi-AP coordination.

FIG. 20 is a diagram showing multi-AP coordination.

Multi-AP coordination uses wired (e.g., enterprise) backbone or wireless (e.g., home mesh) backbone for data+clock synchronization.

Additionally, multi-AP coordination has a more improved link budget and more regulated power limitations as compared to a single AP having a large antenna array.

Techniques for multi-AP coordination include Null Steering for Interference Avoidance, joint beamforming, and joint MU-MIMO.

Example 1: Null Steering for Interference Avoidance

Figure 21:
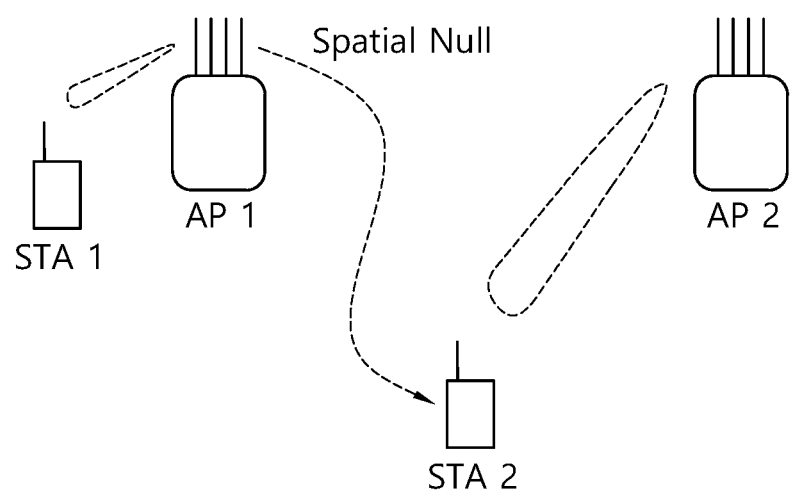
FIG. 21 shows an example of a null steering operation for interference avoidance.

FIG. 21 shows an example of a null steering operation for interference avoidance. Null steering for interference avoidance is useful in case the AP has a large dimension (4×4 or 8×8).

5. AP Coordination

Figure 22:
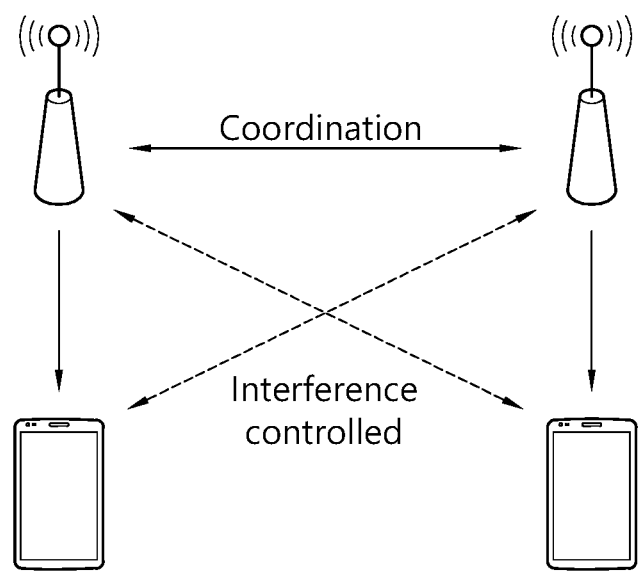
FIG. 22 shows an example wherein AP coordination and interference are being controlled.

FIG. 22 shows an example wherein AP coordination and interference are being controlled.

Coordinated scheduling: Coordinated scheduling mitigates/reduces the number of collisions (or conflicts) from a(n) AP/STA of another BSS.

Additionally, coordinated scheduling is a distributed mechanism and increases the number/probability of parallel transmission in a coordinated manner more than spatial reuse. Herein, message exchange between APs is required.

Figure 23:
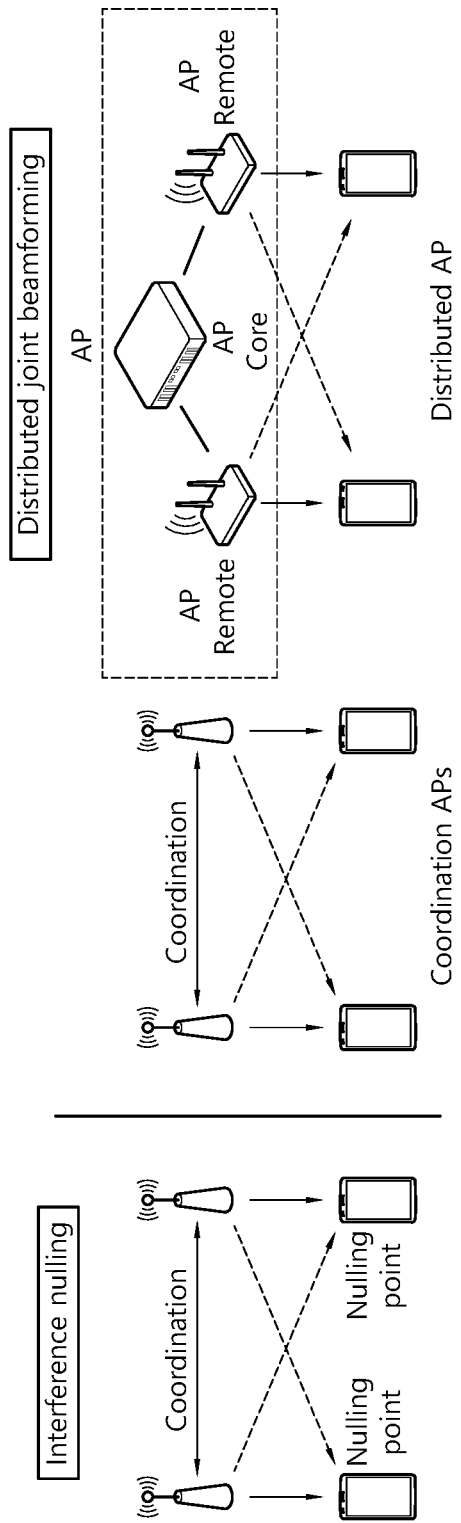
FIG. 23 shows interference nulling and distributed joint beamforming.

FIG. 23 shows interference nulling and distributed joint beamforming.

Coordinated beamforming: Coordinated beamforming may designate a nulling point to another STA or perform downlink transmission at the same time without co-channel interference caused by beamforming, such as distributed joint beamforming.

Additionally, coordinated beamforming is appropriate for managed deployments (e.g., corporate offices, hotels) and has the advantage of area throughput and a consistent user experience. Moreover, adjusted beamforming requires adjusted downlink scheduling and improved MU sounding in order to reduce overhead and synchronization, and so on.

Figure 24:
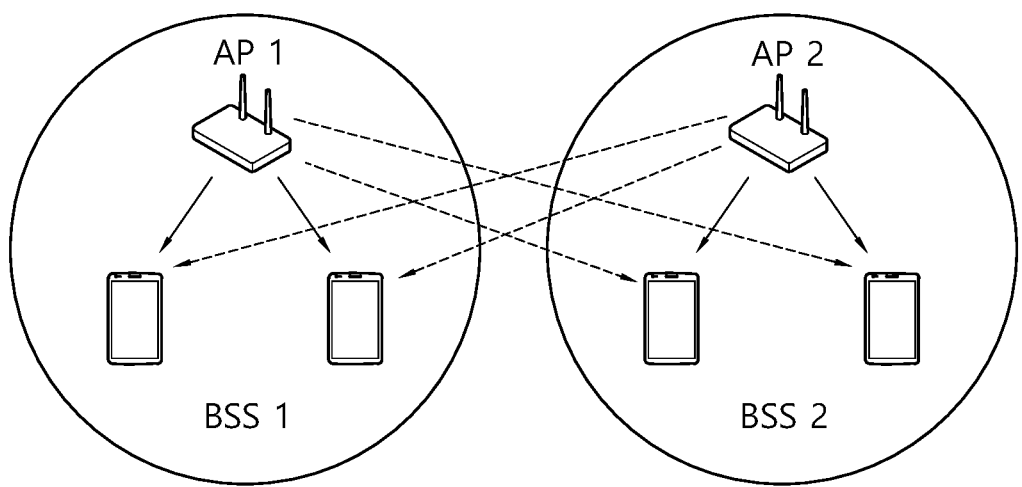
FIG. 24 shows an example of coordinated beamforming.

FIG. 24 shows an example of coordinated beamforming.

The solid arrow in FIG. 24 indicates data transmission within a BSS STA, and the dotted arrow in FIG. 24 is a null transmitted to OBSS STAs. As a main attribute, a signal to a user is transmitted from only one AP while forming a null in the OBSS STA.

Figure 25:
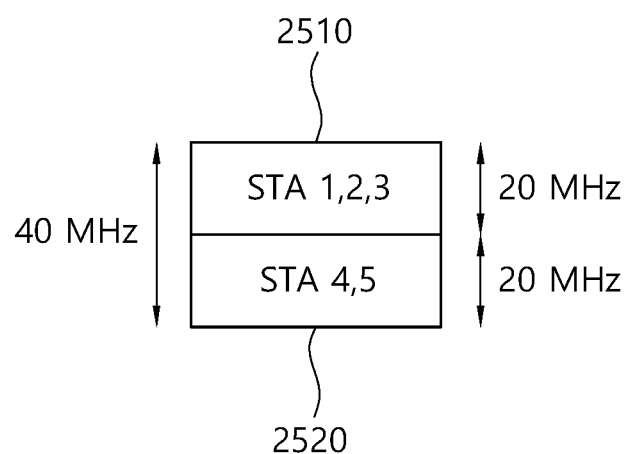
FIG. 25 is a diagram describing C-OFDMA.

FIG. 25 is a diagram describing C-OFDMA.

Coordinated-OFDMA (C-OFDMA) is an extension of 11ax OFDMA from a single BSS to a multi-BSS scenario. Additionally, C-OFDMA efficiently uses (or utilizes) frequency resources throughout the entire network. In addition, C-OFDMA enhances efficiency when BSS traffic does not fully utilize resources.

Referring to FIG. 25, a spectrum (2510) used for transmission of BSS1 and a spectrum (2520) used for transmission of BSS2 each exists in a 20 MHz band in a total band of 40 MHz. Synchronized transmission may be performed in order to obtain orthogonality. STA 1 to STA 3 are allocated to the spectrum (2510) used for transmission of BSS1, and STA 4 and STA 5 are allocated to the spectrum (2520) used for transmission of BSS2.

Figure 26:
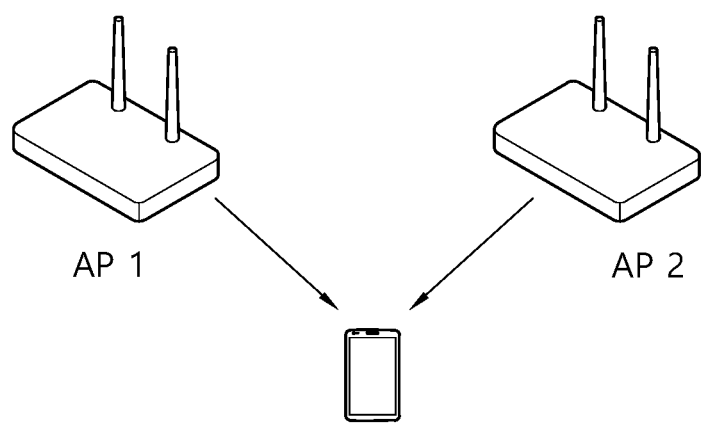
FIG. 26 shows an example of joint transmission.

FIG. 26 shows an example of joint transmission.

Joint transmission means performing joint beamforming to a single STA (J-Tx). Referring to FIG. 26, one STA is receiving services from AP1 and AP2.

Since joint transmission may have stricter synchronization requirements, joint transmission shall be considered separately. Joint transmission may be performed more easily than joint processing transmission for multiple STAs. However, joint transmission may misuse (or exploit) beamforming and power gain from multiple APs.

Figure 27:
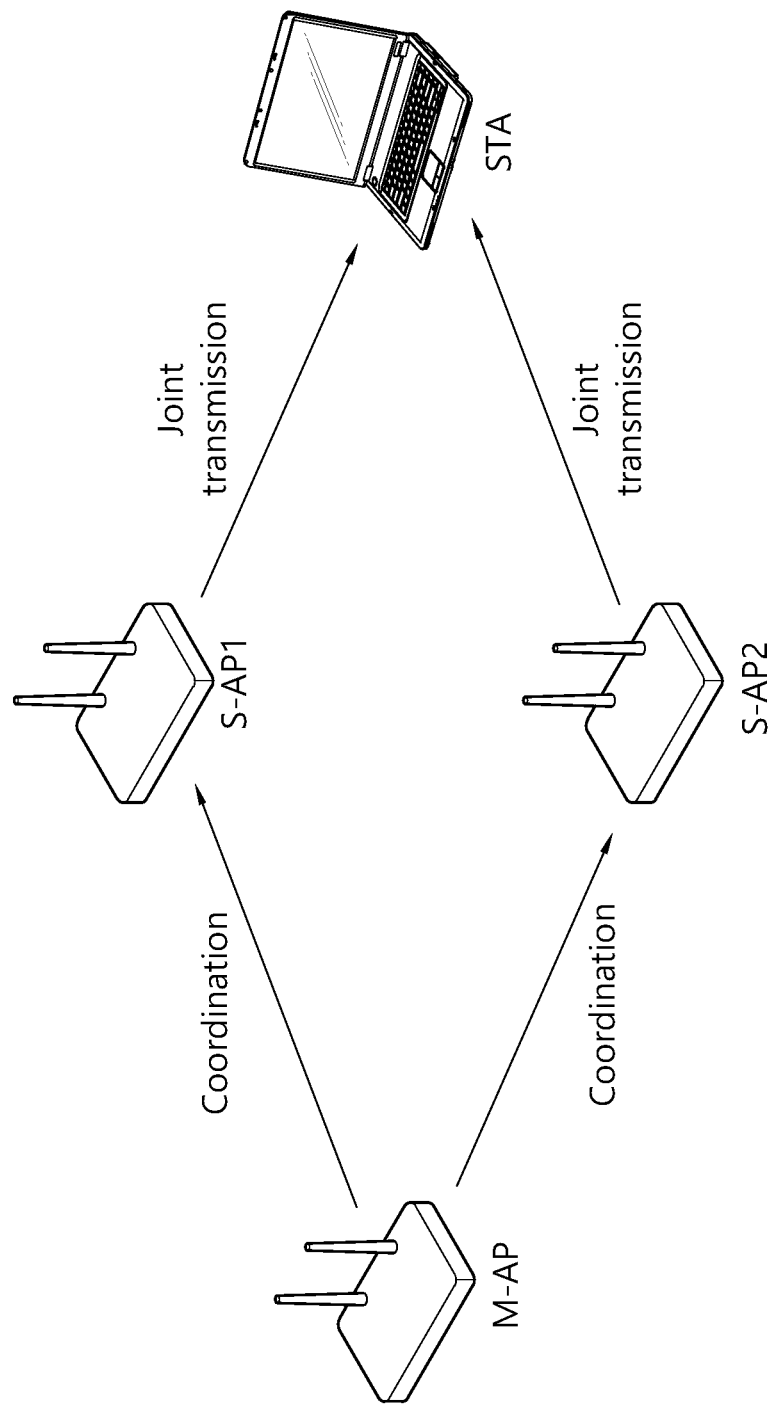
FIG. 27 shows an example of performing joint transmission through an M-AP and S-APs.

FIG. 27 shows an example of performing joint transmission through an M-AP and S-APs.

The Master AP (M-AP) performs the role of an AP coordinator. The Slave AP (S-AP) participates in joint transmission, which is coordinated by the M-AP. Referring to FIG. 27, S-AP1 has the function of an STA in a coordination step (or phase) and has the function of an AP in a transmission step (or phase).

6. Preamble Puncturing

In downlink (DL) U transmission, in case a subchannel is busy, the AP may choose not to fill a specific subchannel having a channel bandwidth of 80 or 160 MHz. In the HE-STF, HE-LTF, and Data fields, which are transmitted in an HE format, preamble puncturing is performed by allocating a free subchannel to the user. The L-STF, L-LTF, L-SIG, RL-SIG, and HE-SIG-B preamble fields are transmitted in a legacy mode and do not transmit a preamble field over a corresponding 20 MHz subchannel by using the technique of preamble puncturing.

Preamble puncturing may be signaled from a Bandwidth field in the HE-SIG-A field of an HE MU PPDU.

TABLE 3

| | Bit | Field | Number of bits | Description |
|---|---|---|---|---|
| Two Parts of HE-SIG-A | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble pucturing in 80 MHz, where in the preamble only one of the two 20 MHz subchannels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, here in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1. |
| | B22 | SIGB Compression | 1 | Set to 0 if the Common field in HE-SIG-B is present. Set to 1 if the Common field in HE-SIG-B is not present. |

Referring to Table 3, which is presented above, if the Bandwidth field is set to 0 to 3, preamble puncturing is set to a non-preamble puncturing mode. If an SIGB Compression field is equal to 0 (if a common field of the BE-SIG1-B exists), preamble puncturing may be applied as described below.

If the Bandwidth field is set to 4, preamble puncturing is performed in 80 MHz, and only the secondary 20 MHz may be punctured in the preamble.

If the Bandwidth field is set to 5, preamble puncturing is performed in 80 MHz, and, in the secondary 40 MHz, only one of the two 20 MHz subchannels may be punctured.

If the Bandwidth field is set to 6, preamble puncturing is performed in 160 MHz or 80+80 MHz, only a secondary 20 MHz may be punctured in a primary 80 MHz of the preamble.

If the Bandwidth field is set to 7, preamble puncturing is performed in 160 MHz or 80+80 MHz, and a primary 80 MHz of a preamble primary 40 MHz may exist.

Hereinafter, an example of transmitting an MU PPDU, by an AP, by using preamble puncturing will be described.

i) In case a secondary 40 MHz channel is in an Idle mode during an interval of PIFS immediately before the start of a TXOP, the AP may transmit an HE MU PPDU by using preamble puncturing in 80 MHz, wherein only a secondary 20 MHz is punctured.

ii) In case only one of two 20 MHz subchannels in a secondary 40 MHz channel are punctured in the preamble, and in case a secondary 20 MHz channel and one of the two 20 MHz subchannels of the secondary 40 MHz channel are in an Idle mode during an interval of PIFS immediately before the start of a TXOP, the AP may transmit an HE MU PPDU by using preamble puncturing in 80 MHz.

iii) In case only a secondary 20 MHz subchannel in a primary 80 MHz channel is punctured in the preamble, and in case a secondary 40 MHz channel and at least one of the four 20 MHz subchannels of a secondary 80 MHz channel are in an Idle mode during an interval of PIFS immediately before the start of a TXOP, the AP may transmit an HE MU PPDU by using preamble puncturing in 160 MHz or 80+80 MHz.

iv) In case only a primary 40 MHz exists in a primary 80 MHz of a preamble, and in case a secondary 20 MHz channel and at least one of the four 20 MHz subchannels of a secondary 80 MHz channel are in an Idle mode during an interval of PIFS immediately before the start of a TXOP, the AP may transmit an HE MU PPDU by using preamble puncturing in 160 MHz or 80+80 MHz.

7. Proposed Embodiment: Multiple AP OFDMA Transmission Method

In a Wi-Fi system, when a data frame is transmitted/received between a UE and an AP, by having APs share channel feedback information and scheduling information of a UE, a Multi-AP coordination technique allows inter-BSS interference to be minimized when transmitting/receiving data or allows data transmission efficiency to be increased by having two or more APs participate (or be involved) in the data transmission/reception for a UE at a specific point. Although the above-described Multi-AP coordination technique is yet to be standardized in the Wi-Fi system, new discussions on the standardization for Multi-AP coordination using a new wi-fi technology have recently been carried out in IEEE802.11 EHT TIG.

Additionally, in an IEEE 802.11 EHT group, Coordinated-OFDMA (C-OFDMA) may be defined as a method of extending an 11ax single BSS OFDMA to multi-BSS OFDMA.

The present specification proposes a mechanism of a method for performing C-OFDMA PPDU transmission by multiple APs.

IEEE 802.11 ax supports preamble puncturing, and when an 11ax AP or STA detects one or more busy non-primary 20 MHz channel(s) before transmitting a PPDU, the 1 1ax AP or STA may transmit the PPDU while the preamble of the busy channel is in a punctured state.

In C-OFDMA, a TXOP holder may be used for transmitting such type of preamble-punctured PPDU, whereas another AP or STA may transmit a frame by using a punctured channel of the PPDU, which is transmitted by the TXOP holder.

However, during a transmission time of the preamble-punctured PPDU, having another STA receive the preamble-punctured PPDU and transmit the frame may not be sufficient.

Additionally, the present specification defines and proposes signaling on an AP being capable of transmitting a C-OFDMA PPDU.

7.1. Distributed Method—Per-20 MHz Channel Based C-OFDMA Transmission

Figure 28:
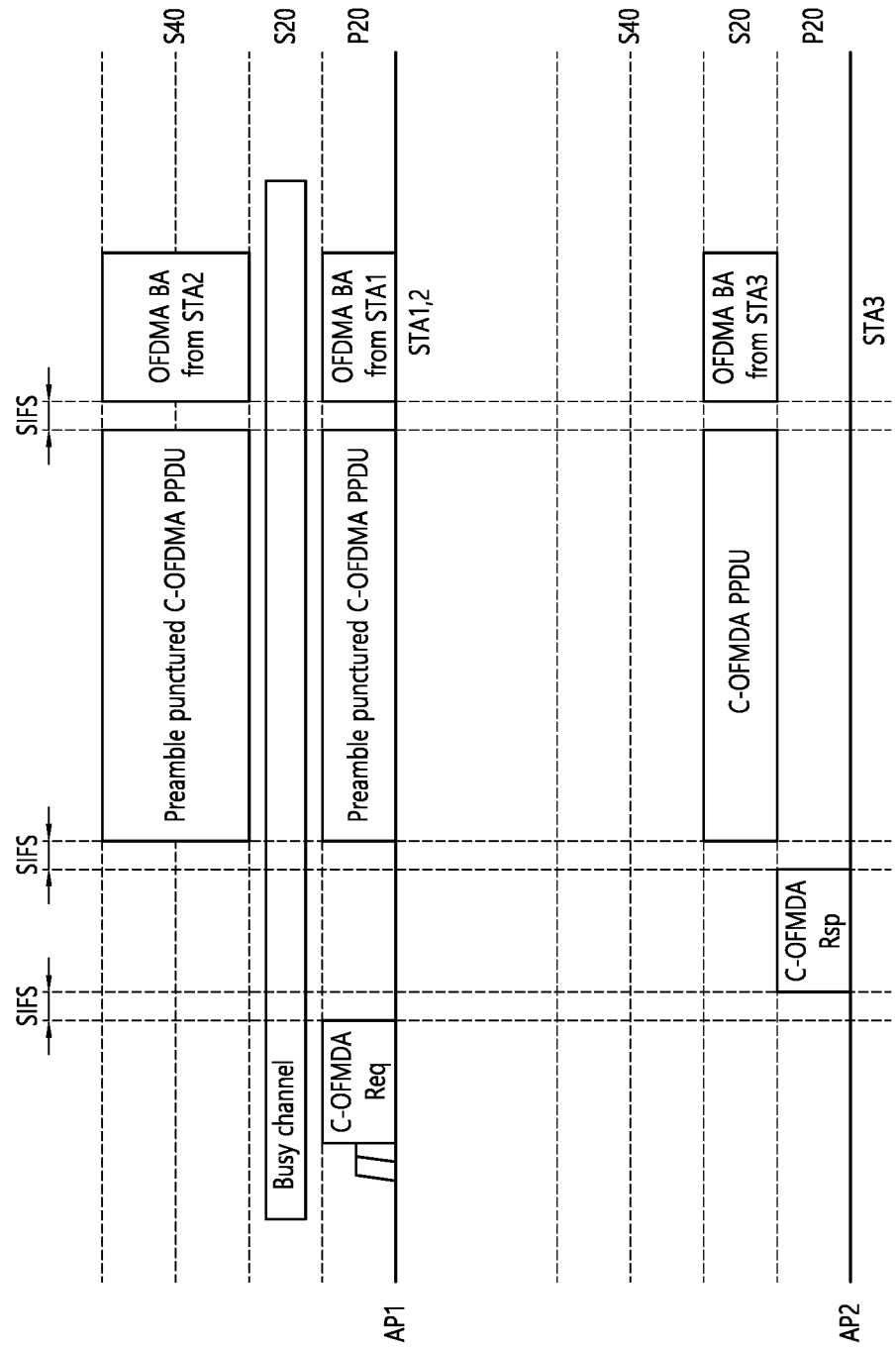
FIG. 28 shows an example of a distributed method for performing C-OFDMA transmission.

FIG. 28 shows an example of a distributed method for performing C-OFDMA transmission.

(1) Step #1: Exchange a C-OFDMA request frame and a C-OFDMA response frame between AP1 (C-OFDMA initiator, or Master AP, or Coordinator AP) and AP2 (C-OFDMA responder, or Slave AP, or Coordinated AP).

Referring to FIG. 28, AP1 transmits a C-OFDMA request frame.

The C-OFDMA request frame includes information indicating a 20 MHz channel (generally one or more non-primary 20 MHz channel(s)) that may be assigned for C-OFDMA transmission related to AP2. The information may be indicated as bitmap information related to each 20 MHz channel.

The C-OFDMA request frame includes resource allocation information that is to be used by one or more neighboring APs (e.g., AP2, which may also be referred to as neighboring AP, slave AP, coordinated AP, and so on) for C-OFDMA transmission. Although it is preferable to use 20 MHz channel unit (or 242 tone RU unit) resource allocation information as the resource allocation information, the present disclosure will not be limited only to this. Additionally, although it is preferable that the resource allocation information being allocated to the neighboring APs includes information indicating one or more non-primary 20 MHz channels, the present disclosure will not be limited only to this. For example, a primary 20 MHz may be included in 20 MHz channel information being allocated to a neighboring AP. When the resource allocation information is a 20 MHz channel information unit, although it is preferable to be capable of indicating the resource allocation information in a bitmap information format for each 20 MHz channel, the present disclosure will not be limited only to this. For example, a specific index value may indicate a 20 MHZ unit resource allocation size and position in a resource allocation index format. For simplicity in the description of the present disclosure, it will be assumed that the resource allocation information is 20 MHz unit information, and that the information is being indicated in a bitmap format.

Additionally, the C-OFDMA request frame includes TXOP duration information for C-OFDMA PPDU transmission, C-OFDMA PPDU length information, and an address of a target AP that is to participate (or be involved) in the C-OFDMA PPDU transmission.

More specifically, the C-OFDMA request frame may include one or more target AP addresses. In case the C-OFDMA request frame includes one or more target AP addresses and trigger information for UL MU transmission, multiple C-OFDMA response frames may be transmitted from multiple APs by using UL MU transmission (e.g., OFDMA, MU-MIMO). In this case, the C-OFDMA request frame shall include information on a specific 20 MHz channel allocated to each AP for C-OFDMA transmission.

Referring to FIG. 28, AP2 transmits a C-OFDMA response frame as a response to the C-OFDMA request frame.

The C-OFDMA response frame includes information on an ACK/NACK on whether or not to transmit a C-OFDMA PPDU over a channel, which is assigned by AP1. The information may be indicated as bitmap information for each 20 MHz channel. (For example, the value 1 of each bit in the bitmap means that AP2 uses a 20 MHz channel for the corresponding bit when performing C-OFDMA transmission. When a specific 20 MHz channel is busy for AP2, the value of the busy channel may be set to 0.)

In case all channels that were allocated by AP1 are being used (busy) by AP2 due to a non-zero Network Allocation Vector (NAV) value, or due to a PHY carrier sensing result after receiving the C-OFDMA request frame, the NACK information may be included in a C-OFDMA response frame (e.g., when all bits are set to 0 in the bitmap, the OFDMA response frame may be determined as a NACK), or AP2 does not send a OFDMA response frame.

Information on the ID (or address) of the STA to which the C-OFDMA PPDU is to be transmitted, by neighboring APs (AP2), may be included in the C-OFDMA response frame.

If AP1 does not receive the C-OFDMA response frame, AP1 views the request frame as a NACK and, for example, performs a Point Coordination Function (PCF) InterFrame Space (PIFS) recovery procedure, which is defined in the conventional (or existing) system (IEEE 802.11/11a/11n/11ac/ . . . ). That is, AP1 transmits a C-OFDMA request frame, and, after a PIFS, AP1 transmits a preamble-punctured C-OFDMA PPDU.

(2) Step #2: Perform C-OFDMA PPDU transmission by AP1 and AP2.

Referring to FIG. 28, after AP1 receives the C-OFDMA response frame having ACK information (i.e., when one or more bits being set to 1 exist in the bitmap), AP1 sends a C-OFDMA PPDU having a punctured 20 MHz channel, which is approved by the C-OFDMA request/response frame, to one or more STAs (e.g., STA1 and STA2) being associated with AP 1. Additionally, as a response to the C-OFDMA PPDU, an immediate verification (or check) response frame (e.g., ACK/BA) shall be transmitted by the corresponding STA (STA1, STA2) in the channel through which the C-OFDMA PPCU is transmitted.

Referring to FIG. 28, after AP2 transmits the C-OFDMA response frame along with ACK information, AP2 transmits a C-OFDMA PPDU to one or more STA(s) (e.g., STA3) being related to AP2 only through a 20 MHz channel being marked as ACK (e.g., a channel being set to 1 in the C-OFDMA response frame).

In order for the C-OFDMA PPDU being transmitted by AP2 to be successfully received by the associated STA(s), the C-OFDMA response frame shall be transmitted over a primary 20 MHz channel of a BSS of AP2 in Step #1.

If a random STA (e.g., STA3) being associated with AP2 overhears the C-OFDMA response frame including ACK information, the random STA shall be prepared to receive the C-OFDMA PPDU, which is transmitted over the non-primary 20 MHz channel.

In case the C-OFDMA response frame include STAID information that is to be addressed in the C-OFDMA PPDU, only the STA that matches the STAID included in the C-OFDMA response frame shall be prepared to received the C-OFDMA PPDU, which is transmitted over the non-primary 20 MHz channel. If the STAID is not included, all STAs being connected to the corresponding AP (i.e., the AP that has transmitted the C-OFDMA response frame), or all STAs being capable of performing channel switch for C-OFDMA, among the STAs being connected to the corresponding AP, may switch to the channel, which is indicated by the response frame, so as to be prepared to receive the C-OFDMA PPDU, which is transmitted by the corresponding AP.

If an immediate verification (or check) response frame is transmitted as a response to the C-OFDMA PPDU, the immediate verification (or check) response frame (e.g., ACK/BA) being transmitted as a response to the C-OFDMA PPDU shall be transmitted within a channel through which the C-OFDMA PPDU is transmitted. If the C-OFDMA PPDU includes a PPDU for multi-users, resource allocation information for the immediate verification (or check) response frame transmission is included in the C-OFDMA PPDU and then transmitted.

Additionally, when responding to multiple C-OFDMA PPDUs, in order to avoid collision (or conflict) with multiple ACK/BA frames that are transmitted by STA(s) being associated with a different AP, an Ack Policy of an MPDU being included in the C-OFDMA PPDU, which is transmitted by a C-OFDMA responder AP, may be set to 11. A BA Request (BAR) and a BA frame are exchanged later on instead of the immediate ACK/BA frame transmission.

7.2. Centralized Method—Per-20 MHz Channel Based C-OFDMA Transmission (1) Step #1: Exchange a C-OFDMA request frame and a C-OFDMA response frame among AP1 (C-OFDMA coordinator, Master AP or Coordinator AP), AP2 and AP3 (C-OFDMA responders, Slave APs or Coordinated AP).

Figure 29:
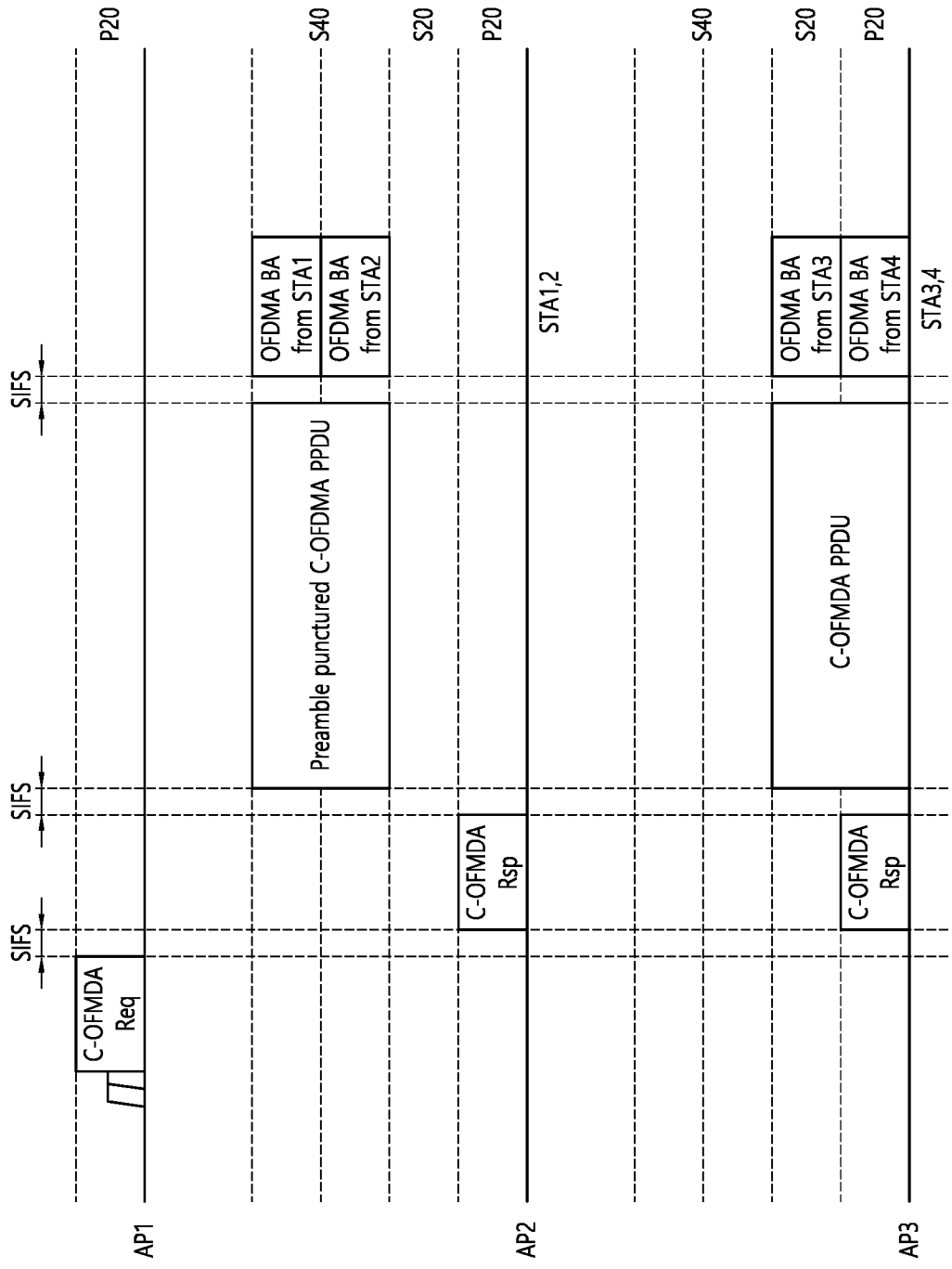
FIG. 29 shows an example of a centralized method for performing C-OFDMA transmission.

FIG. 29 shows an example of a centralized method for performing C-OFDMA transmission.

Referring to FIG. 29, AP1 transmits a C-OFDMA request frame.

The C-OFDMA request frame includes a target AP address of an AP that is to participate in the C-OFDMA PPDU transmission. The C-OFDMA request frame may include one or more target AP addresses. In case the C-OFDMA request frame includes one or more target AP addresses and trigger information for UL MU transmission, multiple C-OFDMA response frames may be transmitted from multiple APs by using UL MU transmission (e.g., OFDMA, MU-MIMO). In this case, the C-OFDMA request frame shall include information on a specific 20 MHz channel allocated to each AP for C-OFDMA transmission.

The C-OFDMA request frame includes resource allocation information that is to be used by one or more neighboring APs (e.g., AP2 and AP3, which may also be referred to as neighboring AP, slave AP, coordinated AP, and so on) for C-OFDMA transmission. Although it is preferable to use 20 MHz channel unit (or 242 tone RU unit) resource allocation information as the resource allocation information, the present disclosure will not be limited only to this. Additionally, although it is preferable that the resource allocation information being allocated to the neighboring APs includes information indicating one or more non-primary 20 MHz channels, the present disclosure will not be limited only to this. For example, a primary 20 MHz may be included in 20 MHz channel information being allocated to a neighboring AP. When the resource allocation information is a 20 MHz channel information unit, although it is preferable to be capable of indicating the resource allocation information in a bitmap information format for each 20 MHz channel, the present disclosure will not be limited only to this. For example, a specific index value may indicate a 20 MHZ unit resource allocation size and position in a resource allocation index format. For simplicity in the description of the present disclosure, it will be assumed that the resource allocation information is 20 MHz unit information, and that the information is being indicated in a bitmap format.

The C-OFDMA request frame includes information indicating a 20 MHz channel that is assigned for C-OFDMA transmission AP2 and AP3. The information may be indicated as bitmap information per 20 MHz channel in each target AP.

The C-OFDMA request frame includes TXOP duration information for C-OFDMA PPDU transmission.

Referring to FIG. 29, AP2 and AP3 transmit a C-OFDMA response frame.

The C-OFDMA response frame includes information on an ACK/NACK on whether or not to transmit a C-OFDMA PPDU over a channel, which is assigned by AP1.

The information may be indicated as bitmap information per 20 MHz channel. (For example, the value 1 of each bit in the bitmap means that AP2 uses a 20 MHz channel for the corresponding bit when performing C-OFDMA transmission. When a specific 20 MHz channel is in usage (busy) for AP2, the value of the channel that is being used (busy channel) may be set to 0.)

In case all channels that were allocated by AP1 are being used (busy) by AP2 due to a non-zero Network Allocation Vector (NAV) value, or due to a PHY carrier sensing result after receiving the C-OFDMA request frame, the NACK information may be included in a C-OFDMA response frame (e.g., when all bits are set to 0 in the bitmap, the OFDMA response frame may be determined as a NACK), or AP2 does not send a OFDMA response frame.

Information on the ID (or address) of the STA to which the C-OFDMA PPDU is to be transmitted, by neighboring APs (AP2), may be included in the C-OFDMA response frame.

If AP1 does not receive the C-OFDMA response frame, AP1 views the request frame as a NACK.

(2) Step #2: Perform C-OFDMA PPDU transmission by AP2 and AP3.

Referring to FIG. 29, after AP2 and AP3 transmit the C-OFDMA response frame along with ACK information (i.e., when one or more bits being set to 1 exist in the bitmap), AP2 and AP3 transmit a C-OFDMA PPDU to one or more STA(s) (e.g., STA3) being connected with AP2 only through a 20 MHz channel being marked as ACK (e.g., a channel being set to 1 in the C-OFDMA response frame).

Since the C-OFDMA PPDU that is transmitted by AP2 may not be transmitted through a primary 20 MHz channel, the intended STA(s) of the PPDU may not be capable of receiving the corresponding PPDU.

In order to enable the intended STA(s) to successfully receive the C-OFDMA PPDU, which is transmitted by AP2, the C-OFDMA response frame shall be transmitted through a primary 20 MHz channel of a BSS of AP2 in Step #1.

If a random STA (e.g., STA3) being associated with AP2 overhears the C-OFDMA response frame including ACK information, the random STA shall be prepared to receive the C-OFDMA PPDU, which is transmitted through the non-primary 20 MHz channel.

In case the C-OFDMA response frame include STAID information that is to be addressed in the C-OFDMA PPDU, only the STA that matches the STAID included in the C-OFDMA response frame shall be prepared to receive the C-OFDMA PPDU, which is transmitted over the non-primary 20 MHz channel. If the STAID is not included, all STAs being connected to the corresponding AP (i.e., the AP that has transmitted the C-OFDMA response frame), or all STAs being capable of performing channel switch for C-OFDMA, among the STAs being connected to the corresponding AP, may switch to the channel, which is indicated by the response frame, so as to be prepared to receive the C-OFDMA PPDU, which is transmitted by the corresponding AP.

The immediate verification (or check) response frame (e.g., ACK/BA) being transmitted as a response to the C-OFDMA PPDU shall be transmitted within a channel through which the C-OFDMA PPDU is transmitted. If the C-OFDMA PPDU includes a PPDU for multi-users, resource allocation information for the immediate verification (or check) response frame transmission is included in the C-OFDMA PPDU and then transmitted.

In the present specification, the unit of a C-OFDMA being allocated to another AP is a 20 MHz channel. However, the C-OFDMA unit may also be defined as an OFDMA RU, such as an 11ax 242-tone RU, which occupies a specific 20 MHz channel bandwidth.

Additionally, the C-OFDMA unit may also be smaller than the 20 MHz channel bandwidth, such as a small RU (e.g., 106-tone RU, 52-tone RU, 26-tone RU). In this case, a C-OFDMA responder AP shall verify (or check) the channel status of each 20 MHz channel, in which the RU being allocated to the AP is positioned. And, as a result of the physical and virtual carrier sensing, the C-OFDMA responder AP shall respond with per-RU ACK/NACK information for each RU being assigned by the C-OFDMA response frame (this may be indicated as bitmap information for each RU).

In order to protect the C-OFDMA transmission, (MU) RTS-CTS/CTS-self/TXOP information of the PHY header or a protection mechanism, which is newly defined prior to the C-OFDMA transmission, may be used.

Hereinafter, the above-described embodiment(s) will be described in more detail with reference to FIG. 18 to FIG. 29.

Figure 30:
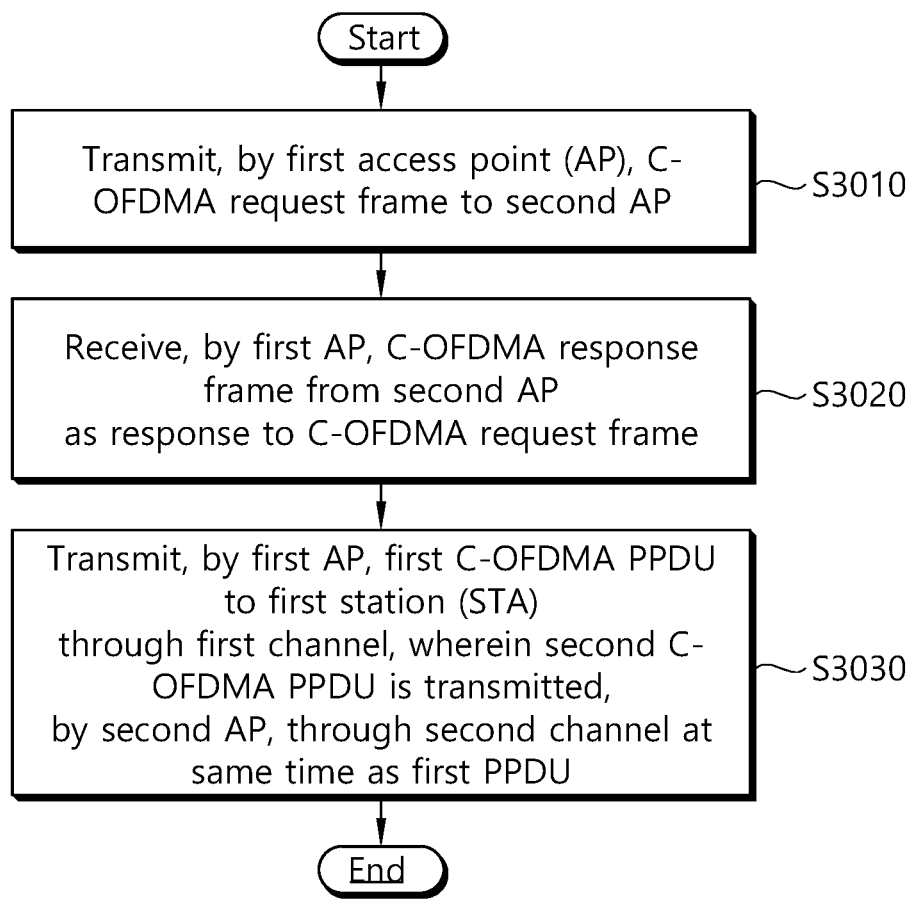
FIG. 30 is a flowchart showing a procedure for transmitting a C-OFDMA PPDU, by a transmitting STA, according the present embodiment.

FIG. 30 is a flowchart showing a procedure for transmitting a C-OFDMA PPDU, by a transmitting STA, according to the present embodiment.

The example of FIG. 30 may be performed in a network environment being supported by a next generation wireless LAN system. The next generation wireless LAN system is an enhanced (or evolved) version of the 802.1 lax system (EHT or 802.11be), which can satisfy backward compatibility with the 802.1 lax system.

The present embodiment is performed by a transmitting station (STA), and the transmitting STA supports multiple access points (APs). In the present embodiment, the transmitting STA may correspond to a first AP or a second AP. A receiving STA of the present embodiment is an STA supporting an Extremely High Throughput (EHT) wireless LAN system, and the receiving STA may correspond to a first STA, a second STA or a third STA.

In step S3010, a first access point (AP) transmits a Coordinated-Orthogonal Frequency Division Multiple Access (C-OFDMA) request frame to a second AP.

In step S3020, the first AP receives a C-OFDMA response frame, from the second AP, as a response to the C-OFDMA request frame.

In step S3030, the first AP transmits a first C-OFDMA PPDU to a first station (STA) through a first channel. At the same time as the first PPDU, a second C-OFDMA PPDU is transmitted, by the second AP, through a second channel.

The C-OFDMA request frame includes first information authorizing (or allowing) usage of the second channel for the second AP. That is, the first AP may notify channels (at least one non-primary 20 MHz channel) through which the second AP may perform C-OFDMA transmission based on the C-OFDMA request frame.

The full channel may include a primary 20 MHz channel and at least one non-primary 20 MHz channel. For example, if the full channel is a channel having a 80 MHz bandwidth, the full channel may include the primary 20 MHz channel, a secondary 20 MHz channel, and a secondary 40 MHz channel (two non-primary 20 MHz channels).

The first information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the second AP that has received the bitmap information may know that the channel being capable of performing C-OFDMA transmission with the first AP is a secondary 20 MHz channel.

The first channel is a channel excluding a preamble-punctured channel from the full channel. The second channel is the preamble-punctured channel.

The first AP may perform carrier sensing for the first and second channels. Based on the carrier sensing result, the first channel may be determined to be idle for the first AP, and the second channel may be determined to be busy for the first AP.

More specifically, the preamble puncturing is preamble puncturing that is defined in 802.1 lax. Herein, the first AP may perform carrier sensing before transmitting the first C-OFDMA PPDU so as to detect that at least one non-primary 20 MHz channel is busy. And, by puncturing the busy non-primary 20 MHz channel, the first AP may transmit the first C-OFDMA PPDU. The second channel may be included in the at least one non-primary 20 MHz channel. That is, the second channel may correspond to a busy 20 MHz channel among the at least one non-primary 20 MHz channel.

According to the above-described embodiment, by having the second AP use a channel that is busy for the first AP, multiple APs may transmit a PPDU at the same time, thereby increasing efficiency in the usage of resource.

The C-OFDMA request frame and the C-OFDMA response frame may be transmitted through the primary 20 MHz channel.

The C-OFDMA request frame may further include second information on a transmission opportunity (TXOP) duration for the first and second C-OFDMA PPDUs, third information on a length of the first and second C-OFDMA PPDUs, and fourth information on a target AP address of an AP participating in first and second C-OFDMA PPDU transmission.

According to the present embodiment, the fourth information may include an address of the second AP. The second AP that has received the fourth information may know that it is capable of performing C-OFDMA transmission with the first AP.

The C-OFDMA response frame may include response information on whether or not to transmit the second C-OFDMA PPDU through the second channel.

If it is determined that the second channel is idle for the second AP, the response information may include ACK information. And, if it is determined that the second channel is busy for the second AP, the response information may include NACK information.

The response information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the first AP that has received the bitmap information may know that the second AP is capable of performing C-OFDMA transmission through a secondary 20 MHz channel. (Herein, the first AP may know that the secondary 20 MHz channel is idle for the second AP.)

In case the first and second channels are configured of at least one resource unit (RU) having a bandwidth smaller than a 20 MHz channel, the first information and the response information may be bitmap information being configured of bits for each of the at least one RU. At this point, the RU may be an RU being configured 106 tones, an RU being configured of 52 tones, or an RU being configured of 26 tones.

For example, it may be assumed that the full channel is a channel having a 80 MHz bandwidth, and that the channel having the 80 MHz bandwidth is configured of eight 106-tone RUs and four 26-tone RUs. At this point, the first information and the response information may be configured of bits for each of the 12 RUs, which may be configured of 12-bit bitmap information. Based on the first information and the response information, an RU through which the first C-OFDMA PPDU is to be transmitted and an RU through which the second C-OFDMA PPDU is to be transmitted (the RU that is to be preamble-punctured) may be determined.

The C-OFDMA response frame may further include STA identifier information of an STA to which the second C-OFDMA PPDU is to be transmitted. Accordingly, the second C-OFDMA PPDU may be transmitted, by the second AP, to a second STA being included in the STA identifier information.

Additionally, the first AP or the second AP may perform MU transmission.

As an example, the first channel may include the first primary 20 MHz channel and a secondary 40 MHz channel. And, the second channel may include the secondary 20 MHz channel.

At this point, the first AP may transmit the first C-OFDMA PPDU to the first STA through the primary 20 MHz channel. And, the first AP may receive a Block Ack (BA) for the first C-OFDMA PPDU from the first STA through the primary 20 MHz channel.

Additionally, the first AP may transmit the first C-OFDMA PPDU to a third STA through the secondary 40 MHz channel. And, the first AP may receive a BA for the first C-OFDMA PPDU from the third STA through the secondary 40 MHz channel.

The second C-OFDMA PPDU may be transmitted to the second STA through the secondary 20 MHz channel, and a BA for the second C-OFDMA PPDU may be received from the second STA through the secondary 20 MHz channel.

The BA may be received through the same channel as the channel through which the C-OFDMA PPDU was transmitted. Thus, the collision of multiple ACK information may be prevented.

As another example, the first AP may perform the role of a Master-AP (M-AP), and C-OFDMA transmission may be performed between the second AP and the third AP. The first AP may transmit the C-OFDMA request frame to the second AP and the third AP. And, the second AP and the third AP may transmit the C-OFDMA response frame to the first AP as a response to the C-OFDMA request frame.

At this point, the second AP may transmit the first C-OFDMA PPDU to the first STA through the first channel, and the third AP may transmit the second C-OFDMA PPDU to the second STA through the second channel. Similarly, the first channel may be a channel excluding a preamble-punctured channel from the full channel, and the second channel may be the preamble-punctured channel.

Figure 31:
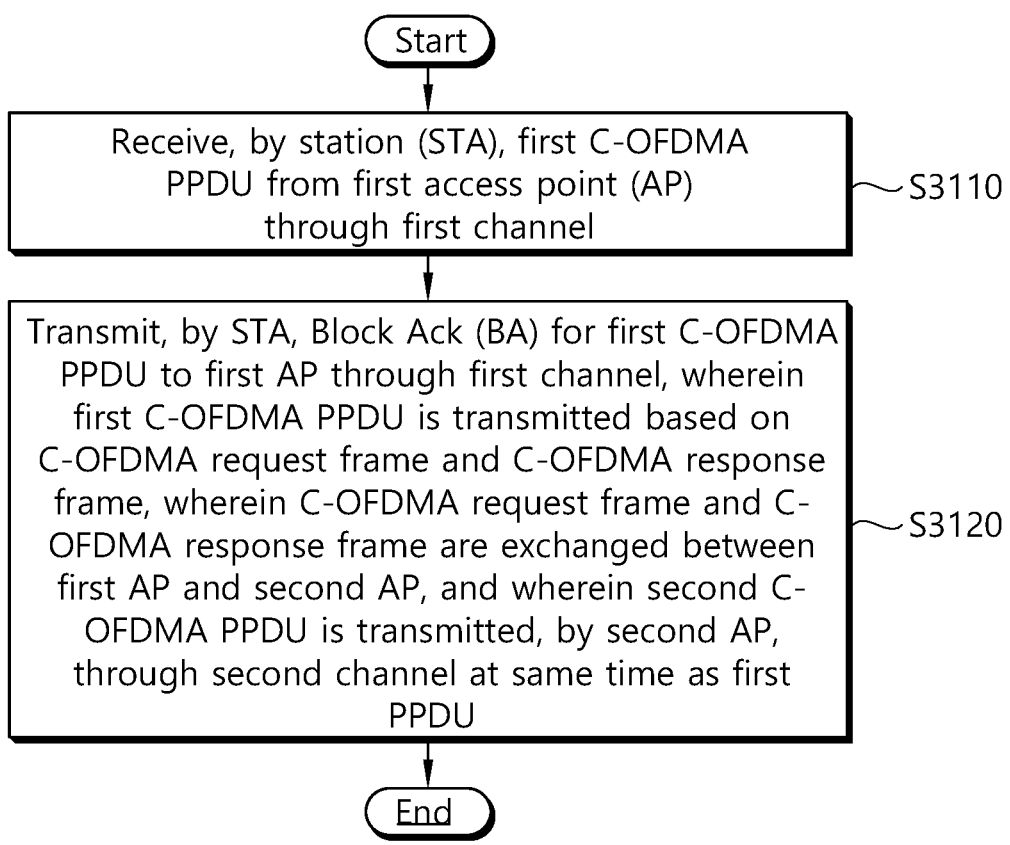
FIG. 31 is a flowchart showing a procedure for receiving a C-OFDMA PPDU, by a receiving STA, according the present embodiment.

FIG. 31 is a flowchart showing a procedure for receiving a C-OFDMA PPDU, by a receiving STA, according the present embodiment.

The example of FIG. 31 may be performed in a network environment being supported by a next generation wireless LAN system. The next generation wireless LAN system is an enhanced (or evolved) version of the 802.1 lax system (EHT or 802.11be), which can satisfy backward compatibility with the 802.1 lax system.

The present embodiment is performed by a receiving station (STA), and the receiving STA is an STA supporting an Extremely High Throughput (EHT) wireless LAN system, and the receiving STA may correspond to a first STA, a second STA or a third STA. A transmitting STA of the present embodiment supports multiple access points (APs), and the transmitting STA may correspond to a first AP or a second AP.

In step S3110, a station (STA) receives a first C-OFDMA PPDU from a first access point (AP) through a first channel. A second C-OFDMA PPDU is transmitted, by the second AP, through a second channel at a same time as the first PPDU.

In step S3120, the STA transmits a Block Ack (BA) for the first C-OFDMA PPDU to the first AP through the first channel.

The first C-OFDMA PPDU is transmitted based on a C-OFDMA request frame and a C-OFDMA response frame.

The C-OFDMA request frame and the C-OFDMA response frame are exchanged between the first AP and the second AP. That is, the first AP transmits a C-OFDMA request frame to the second AP, and the first AP receives a C-OFDMA response frame from the second AP as a response to the C-OFDMA request frame.

The C-OFDMA request frame includes first information authorizing (or allowing) usage of the second channel for the second AP. That is, the first AP may notify channels (at least one non-primary 20 MHz channel) through which the second AP may perform C-OFDMA transmission based on the C-OFDMA request frame.

The full channel may include a primary 20 MHz channel and at least one non-primary 20 MHz channel. For example, if the full channel is a channel having an 80 MHz bandwidth, the full channel may include the primary 20 MHz channel, a secondary 20 MHz channel, and a secondary 40 MHz channel (two non-primary 20 MHz channels).

The first information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the second AP that has received the bitmap information may know that the channel being capable of performing C-OFDMA transmission with the first AP is a secondary 20 MHz channel.

The first channel is a channel excluding a preamble-punctured channel from the full channel. The second channel is the preamble-punctured channel.

The first AP may perform carrier sensing for the first and second channels. Based on the carrier sensing result, the first channel may be determined to be idle for the first AP, and the second channel may be determined to be busy for the first AP.

More specifically, the preamble puncturing is preamble puncturing that is defined in 802.1 lax. Herein, the first AP may perform carrier sensing before transmitting the first C-OFDMA PPDU so as to detect that at least one non-primary 20 MHz channel is busy. And, by puncturing the busy non-primary 20 MHz channel, the first AP may transmit the first C-OFDMA PPDU. The second channel may be included in the at least one non-primary 20 MHz channel. That is, the second channel may correspond to a busy 20 MHz channel among the at least one non-primary 20 MHz channel.

According to the above-described embodiment, by having the second AP use a channel that is busy for the first AP, multiple APs may transmit a PPDU at the same time, thereby increasing efficiency in the usage of resource.

The C-OFDMA request frame and the C-OFDMA response frame may be transmitted through the primary 20 MHz channel.

The C-OFDMA request frame may further include second information on a transmission opportunity (TXOP) duration for the first and second C-OFDMA PPDUs, third information on a length of the first and second C-OFDMA PPDUs, and fourth information on a target AP address of an AP participating in first and second C-OFDMA PPDU transmission.

According to the present embodiment, the fourth information may include an address of the second AP. The second AP that has received the fourth information may know that it is capable of performing C-OFDMA transmission with the first AP.

The C-OFDMA response frame may include response information on whether or not to transmit the second C-OFDMA PPDU through the second channel.

If it is determined that the second channel is idle for the second AP, the response information may include ACK information. And, if it is determined that the second channel is busy for the second AP, the response information may include NACK information.

The response information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the first AP that has received the bitmap information may know that the second AP is capable of performing C-OFDMA transmission through a secondary 20 MHz channel. (Herein, the first AP may know that the secondary 20 MHz channel is idle for the second AP.)

In case the first and second channels are configured of at least one resource unit (RU) having a bandwidth smaller than a 20 MHz channel, the first information and the response information may be bitmap information being configured of bits for each of the at least one RU. At this point, the RU may be an RU being configured 106 tones, an RU being configured of 52 tones, or an RU being configured of 26 tones.

For example, it may be assumed that the full channel is a channel having a 80 MHz bandwidth, and that the channel having the 80 MHz bandwidth is configured of eight 106-tone RUs and four 26-tone RUs. At this point, the first information and the response information may be configured of bits for each of the 12 RUs, which may be configured of 12-bit bitmap information. Based on the first information and the response information, an RU through which the first C-OFDMA PPDU is to be transmitted and an RU through which the second C-OFDMA PPDU is to be transmitted (the RU that is to be preamble-punctured) may be determined.

The C-OFDMA response frame may further include STA identifier information of an STA to which the second C-OFDMA PPDU is to be transmitted. Accordingly, the second C-OFDMA PPDU may be transmitted, by the second AP, to a second STA being included in the STA identifier information.

Additionally, the first AP or the second AP may perform MU transmission.

As an example, the first channel may include the first primary 20 MHz channel and a secondary 40 MHz channel. And, the second channel may include the secondary 20 MHz channel.

At this point, the first AP may transmit the first C-OFDMA PPDU to the first STA through the primary 20 MHz channel. And, the first AP may receive a Block Ack (BA) for the first C-OFDMA PPDU from the first STA through the primary 20 MHz channel.

Additionally, the first AP may transmit the first C-OFDMA PPDU to a third STA through the secondary 40 MHz channel. And, the first AP may receive a BA for the first C-OFDMA PPDU from the third STA through the secondary 40 MHz channel.

The second C-OFDMA PPDU may be transmitted to the second STA through the secondary 20 MHz channel, and a BA for the second C-OFDMA PPDU may be received from the second STA through the secondary 20 MHz channel.

The BA may be received through the same channel as the channel through which the C-OFDMA PPDU was transmitted. Thus, the collision of multiple ACK information may be prevented.

As another example, the first AP may perform the role of a Master-AP (M-AP), and C-OFDMA transmission may be performed between the second AP and the third AP. The first AP may transmit the C-OFDMA request frame to the second AP and the third AP. And, the second AP and the third AP may transmit the C-OFDMA response frame to the first AP as a response to the C-OFDMA request frame.

At this point, the second AP may transmit the first C-OFDMA PPDU to the first STA through the first channel, and the third AP may transmit the second C-OFDMA PPDU to the second STA through the second channel. Similarly, the first channel may be a channel excluding a preamble-punctured channel from the full channel, and the second channel may be the preamble-punctured channel.

8. Device Configuration

Figure 32:
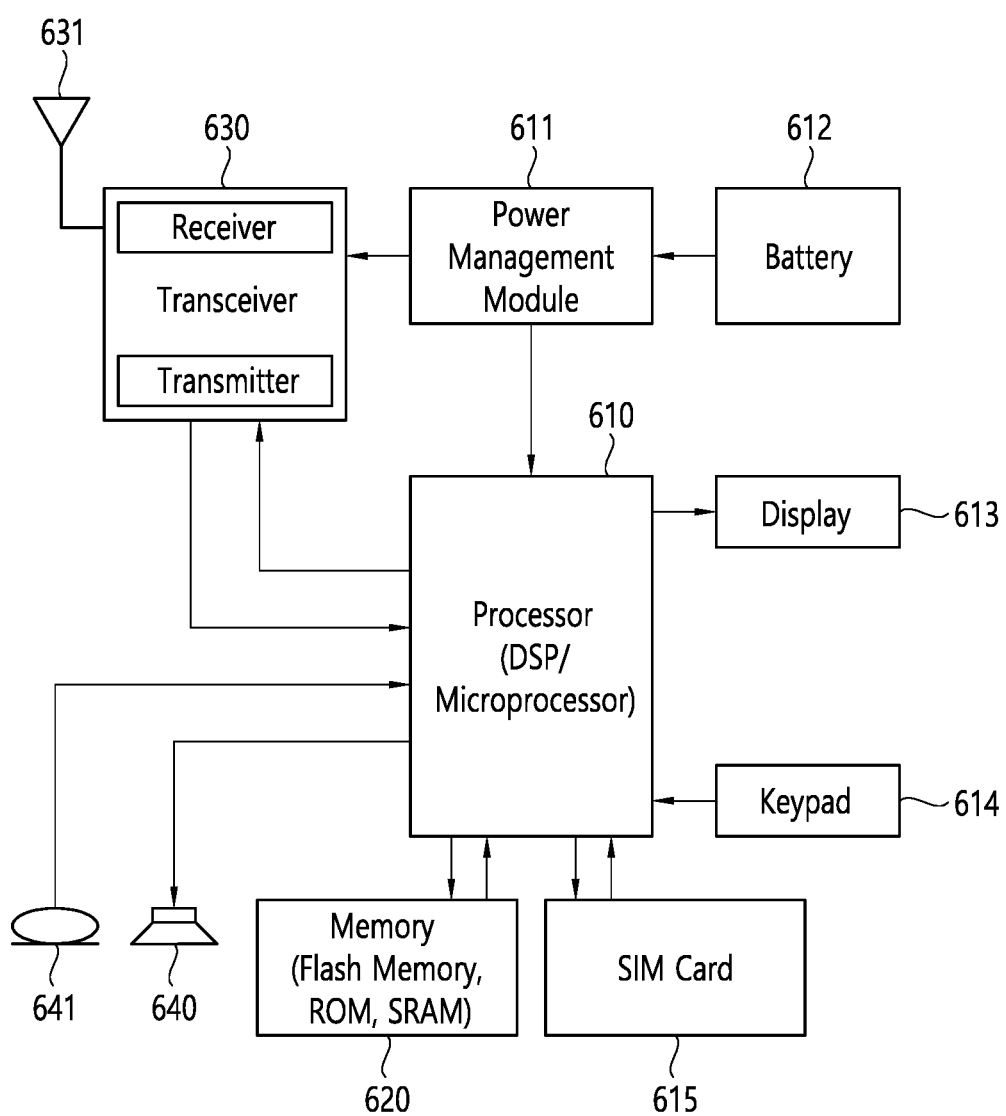
FIG. 32 shows a UE to which the technical features of the present disclosure can be applied.

FIG. 32 shows a UE to which the technical features of the present disclosure can be applied. The present disclosure described above for the transmitting apparatus (or device) or receiving apparatus (or device) may be applied to this embodiment.

A UE includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure described below. The processor (610) may be configured to control one or more other components of the UE (600) to implement proposed functions, procedures and/or methods of the present disclosure described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of a transmitting STA, the processor (610) exchanges a C-OFDMA request frame and a C-OFDMA response frame with a second AP and transmits a first C-OFDMA PPDU to a first STA through a first channel. At this point, a second C-OFDMA PPDU is transmitted, by the second AP, through a second channel at a same time as the first PPDU.

In case of a receiving STA, the processor (610) receives a first C-OFDMA PPDU from a first AP through a first channel and transmits a BA for the first C-OFDMA PPDU to the first AP through the first channel. At this point, the first C-OFDMA PPDU is transmitted based on a C-OFDMA request frame and a C-OFDMA response frame, and the C-OFDMA request frame and the C-OFDMA response frame are exchanged between the first AP and the second AP.

The C-OFDMA request frame includes first information authorizing (or allowing) usage of the second channel for the second AP. That is, the first AP may notify channels (at least one non-primary 20 MHz channel) through which the second AP may perform C-OFDMA transmission based on the C-OFDMA request frame.

The full channel may include a primary 20 MHz channel and at least one non-primary 20 MHz channel. For example, if the full channel is a channel having an 80 MHz bandwidth, the full channel may include the primary 20 MHz channel, a secondary 20 MHz channel, and a secondary 40 MHz channel (two non-primary 20 MHz channels).

The first information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the second AP that has received the bitmap information may know that the channel being capable of performing C-OFDMA transmission with the first AP is a secondary 20 MHz channel.

The first channel is a channel excluding a preamble-punctured channel from the full channel. The second channel is the preamble-punctured channel.

The first AP may perform carrier sensing for the first and second channels. Based on the carrier sensing result, the first channel may be determined to be idle for the first AP, and the second channel may be determined to be busy for the first AP.

More specifically, the preamble puncturing is preamble puncturing that is defined in 802.1 lax. Herein, the first AP may perform carrier sensing before transmitting the first C-OFDMA PPDU so as to detect that at least one non-primary 20 MHz channel is busy. And, by puncturing the busy non-primary 20 MHz channel, the first AP may transmit the first C-OFDMA PPDU. The second channel may be included in the at least one non-primary 20 MHz channel. That is, the second channel may correspond to a busy 20 MHz channel among the at least one non-primary 20 MHz channel.

According to the above-described embodiment, by having the second AP use a channel that is busy for the first AP, multiple APs may transmit a PPDU at the same time, thereby increasing efficiency in the usage of resource.

The C-OFDMA request frame and the C-OFDMA response frame may be transmitted through the primary 20 MHz channel.

The C-OFDMA request frame may further include second information on a transmission opportunity (TXOP) duration for the first and second C-OFDMA PPDUs, third information on a length of the first and second C-OFDMA PPDUs, and fourth information on a target AP address of an AP participating in first and second C-OFDMA PPDU transmission.

According to the present embodiment, the fourth information may include an address of the second AP. The second AP that has received the fourth information may know that it is capable of performing C-OFDMA transmission with the first AP.

The C-OFDMA response frame may include response information on whether or not to transmit the second C-OFDMA PPDU through the second channel.

If it is determined that the second channel is idle for the second AP, the response information may include ACK information. And, if it is determined that the second channel is busy for the second AP, the response information may include NACK information.

The response information may be bitmap information being configured of bits for each of the primary 20 MHz channel and the at least one non-primary 20 MHz channel. For example, if the full channel is a channel having an 80 MHz bandwidth, 1 bit is assigned per 20 MHz, so that the first information can be indicated at 4-bit bitmap information. If the bitmap information is '0100', the first AP that has received the bitmap information may know that the second AP is capable of performing C-OFDMA transmission through a secondary 20 MHz channel. (Herein, the first AP may know that the secondary 20 MHz channel is idle for the second AP.)

In case the first and second channels are configured of at least one resource unit (RU) having a bandwidth smaller than a 20 MHz channel, the first information and the response information may be bitmap information being configured of bits for each of the at least one RU. At this point, the RU may be an RU being configured 106 tones, an RU being configured of 52 tones, or an RU being configured of 26 tones.

For example, it may be assumed that the full channel is a channel having a 80 MHz bandwidth, and that the channel having the 80 MHz bandwidth is configured of eight 106-tone RUs and four 26-tone RUs. At this point, the first information and the response information may be configured of bits for each of the 12 RUs, which may be configured of 12-bit bitmap information. Based on the first information and the response information, an RU through which the first C-OFDMA PPDU is to be transmitted and an RU through which the second C-OFDMA PPDU is to be transmitted (the RU that is to be preamble-punctured) may be determined.

The C-OFDMA response frame may further include STA identifier information of an STA to which the second C-OFDMA PPDU is to be transmitted. Accordingly, the second C-OFDMA PPDU may be transmitted, by the second AP, to a second STA being included in the STA identifier information.

Additionally, the first AP or the second AP may perform MU transmission.

As an example, the first channel may include the first primary 20 MHz channel and a secondary 40 MHz channel. And, the second channel may include the secondary 20 MHz channel.

At this point, the first AP may transmit the first C-OFDMA PPDU to the first STA through the primary 20 MHz channel. And, the first AP may receive a Block Ack (BA) for the first C-OFDMA PPDU from the first STA through the primary 20 MHz channel.

Additionally, the first AP may transmit the first C-OFDMA PPDU to a third STA through the secondary 40 MHz channel. And, the first AP may receive a BA for the first C-OFDMA PPDU from the third STA through the secondary 40 MHz channel.

The second C-OFDMA PPDU may be transmitted to the second STA through the secondary 20 MHz channel, and a BA for the second C-OFDMA PPDU may be received from the second STA through the secondary 20 MHz channel.

The BA may be received through the same channel as the channel through which the C-OFDMA PPDU was transmitted. Thus, the collision of multiple ACK information may be prevented.

As another example, the first AP may perform the role of a Master-AP (M-AP), and C-OFDMA transmission may be performed between the second AP and the third AP. The first AP may transmit the C-OFDMA request frame to the second AP and the third AP. And, the second AP and the third AP may transmit the C-OFDMA response frame to the first AP as a response to the C-OFDMA request frame.

At this point, the second AP may transmit the first C-OFDMA PPDU to the first STA through the first channel, and the third AP may transmit the second C-OFDMA PPDU to the second STA through the second channel. Similarly, the first channel may be a channel excluding a preamble-punctured channel from the full channel, and the second channel may be the preamble-punctured channel.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method for transmitting a Coordinated-Orthogonal Frequency Division Multiple Access (C-OFDMA) Physical Protocol Data Unit (PPDU) in a wireless LAN system, the method comprising:

transmitting, by a first access point (AP), a C-OFDMA request frame to a second AP;

receiving, by the first AP, a C-OFDMA response frame from the second AP as a response to the C-OFDMA request frame; and transmitting, by the first AP, a first C-OFDMA PPDU to a first station (STA) through a first channel, wherein a second C-OFDMA PPDU is transmitted, by the second AP, through a second channel at a same time as the first PPDU, wherein the C-OFDMA request frame includes first information authorizing usage of the second channel for the second AP, wherein the first channel is a channel excluding a preamble-punctured channel from a full channel, and wherein the second channel is the preamble-punctured channel.

2. The method of claim 1, further comprising:

performing, by the first AP, carrier sensing for the first and second channels, wherein, based on the carrier sensing result, the first channel is determined to be idle for the first AP, and the second channel is determined to be busy for the first AP.

3. The method of claim 1, wherein the full channel includes a primary 20 MHz channel and at least one non-primary 20 MHz channel, wherein the C-OFDMA request frame and the C-OFDMA response frame are transmitted through the primary 20 MHz channel, and wherein the second channel is included in the at least one non-primary 20 MHz channel.

4. The method of claim 1, wherein the C-OFDMA request frame further includes second information on a transmission opportunity (TXOP) duration for the first and second C-OFDMA PPDUs, third information on a length of the first and second C-OFDMA PPDUs, and fourth information on a target AP address of an AP participating in first and second C-OFDMA PPDU transmission, and
wherein the fourth information includes an address of the second AP.

5. The method of claim 3, wherein the first information is bitmap information being configured of bits for each of the primary 20 MHz channel and the at least one non-primary 20 MHz channel.

6. The method of claim 3, wherein the C-OFDMA response frame includes response information on whether or not to transmit the second C-OFDMA PPDU through the second channel,
wherein, if it is determined that the second channel is idle for the second AP, the response information includes ACK information, and
wherein, if it is determined that the second channel is busy for the second AP, the response information includes NACK information.

7. The method of claim 6, wherein, in case the first and second channels are configured of at least one resource unit (RU) having a bandwidth smaller than a 20 MHz channel, the first information and the response information are bitmap information being configured of bits for each of the at least one RU, and
wherein the RU is an RU being configured 106 tones, an RU being configured of 52 tones, or an RU being configured of 26 tones.

8. The method of claim 6, wherein the C-OFDMA response frame further includes STA identifier information of an STA to which the second C-OFDMA PPDU is to be transmitted, and
wherein the second C-OFDMA PPDU is transmitted, by the second AP, to a second STA being included in the STA identifier information.

9. The method of claim 8, wherein the first channel includes the first primary 20 MHz channel and a secondary 40 MHz channel,
wherein the second channel includes the secondary 20 MHz channel,
wherein the method further comprises:
transmitting, by the first AP, the first C-OFDMA PPDU to the first STA through the primary 20 MHz channel;
receiving, by the first AP, a Block Ack (BA) for the first C-OFDMA PPDU from the first STA through the primary 20 MHz channel;
transmitting, by the first AP, the first C-OFDMA PPDU to a third STA through the secondary 40 MHz channel; and
receiving, by the first AP, a BA for the first C-OFDMA PPDU from the third STA through the secondary 40 MHz channel,
wherein the second C-OFDMA PPDU is transmitted to the second STA through the secondary 20 MHz channel, and
wherein a BA for the second C-OFDMA PPDU is received from the second STA through the secondary 20 MHz channel.

10. A wireless device being a first access point (AP) for transmitting a Coordinated-Orthogonal Frequency Division Multiple Access (C-OFDMA) Physical Protocol Data Unit (PPDU) in a wireless LAN system, the first AP comprising:
a memory;
a transceiver; and
a processor being operatively connected to the memory and the transceiver,
wherein the processor is configured to:
transmit a C-OFDMA request frame to a second AP,
receive a C-OFDMA response frame from the second AP as a response to the C-OFDMA request frame, and
transmit a first C-OFDMA PPDU to a first station (STA) through a first channel, wherein a second C-OFDMA PPDU is transmitted, by the second AP, through a second channel at a same time as the first PPDU,
wherein the C-OFDMA request frame includes first information authorizing usage of the second channel for the second AP,
wherein the first channel is a channel excluding a preamble-punctured channel from a full channel, and
wherein the second channel is the preamble-punctured channel.

11. The wireless device of claim 10, wherein the processor performs carrier sensing for the first and second channels,
wherein, based on the carrier sensing result, the first channel is determined to be idle for the first AP, and the second channel is determined to be busy for the first AP.

12. The wireless device of claim 10, wherein the full channel includes a primary 20 MHz channel and at least one non-primary 20 MHz channel,
wherein the C-OFDMA request frame and the C-OFDMA response frame are transmitted through the primary 20 MHz channel, and
wherein the second channel is included in the at least one non-primary 20 MHz channel.

13. The wireless device of claim 10, wherein the C-OFDMA request frame further includes second information on a transmission opportunity (TXOP) duration for the first and second C-OFDMA PPDUs, third information on a length of the first and second C-OFDMA PPDUs, and fourth information on a target AP address of an AP participating in first and second C-OFDMA PPDU transmission, and
wherein the fourth information includes an address of the second AP.

14. The wireless device of claim 12, wherein the first information is bitmap information being configured of bits for each of the primary 20 MHz channel and the at least one non-primary 20 MHz channel.

15. The wireless device of claim 12, wherein the C-OFDMA response frame includes response information on whether or not to transmit the second C-OFDMA PPDU through the second channel,
wherein, if it is determined that the second channel is idle for the second AP, the response information includes ACK information, and
wherein, if it is determined that the second channel is busy for the second AP, the response information includes NACK information.

16. The wireless device of claim 15, wherein, in case the first and second channels are configured of at least one resource unit (RU) having a bandwidth smaller than a 20 MHz channel, the first information and the response information are bitmap information being configured of bits for each of the at least one RU, and
wherein the RU is an RU being configured 106 tones, an RU being configured of 52 tones, or an RU being configured of 26 tones.

17. The wireless device of claim 15, wherein the C-OFDMA response frame further includes STA identifier information of an STA to which the second C-OFDMA PPDU is to be transmitted, and wherein the second C-OFDMA PPDU is transmitted, by the second AP, to a second STA being included in the STA identifier information.

18. The wireless device of claim 17, wherein the first channel includes the first primary 20 MHz channel and a secondary 40 MHz channel,
wherein the second channel includes the secondary 20 MHz channel,
wherein the processor transmits the first C-OFDMA PPDU to the first STA through the primary 20 MHz channel,
wherein the processor receives a Block Ack (BA) for the first C-OFDMA PPDU from the first STA through the primary 20 MHz channel,
wherein the processor transmits the first C-OFDMA PPDU to a third STA through the secondary 40 MHz channel, and
wherein the processor receives a BA for the first C-OFDMA PPDU from the third STA through the secondary 40 MHz channel,
wherein the second C-OFDMA PPDU is transmitted to the second STA through the secondary 20 MHz channel, and
wherein a BA for the second C-OFDMA PPDU is received from the second STA through the secondary 20 MHz channel.

19. A method for receiving a Coordinated-Orthogonal Frequency Division Multiple Access (C-OFDMA) Physical Protocol Data Unit (PPDU) in a wireless LAN system, the method comprising:
receiving, by a station (STA), a first C-OFDMA PPDU from a first access point (AP) through a first channel; and
transmitting, by the STA, a Block Ack (BA) for the first C-OFDMA PPDU to the first AP through the first channel,
wherein the first C-OFDMA PPDU is transmitted based on a C-OFDMA request frame and a C-OFDMA response frame,
wherein the C-OFDMA request frame and the C-OFDMA response frame are exchanged between the first AP and the second AP,
wherein a second C-OFDMA PPDU is transmitted, by the second AP, through a second channel at a same time as the first PPDU,
wherein the C-OFDMA request frame includes first information authorizing usage of the second channel for the second AP,
wherein the first channel is a channel excluding a preamble-punctured channel from a full channel, and
wherein the second channel is the preamble-punctured channel.

* * * * *